US011431182B2

(12) United States Patent
Gou et al.

(10) Patent No.: US 11,431,182 B2
(45) Date of Patent: *Aug. 30, 2022

(54) RESOURCE STATISTICS COLLECTION METHOD AND APPARATUS AND TERMINAL

(71) Applicant: HUAWEI TECHNOLOGIES CO., LTD., Shenzhen (CN)

(72) Inventors: Junwei Gou, Shanghai (CN); Zhishan Zhuang, Shanghai (CN); Chi Zhang, Shanghai (CN); Zhonglin Xia, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/084,640

(22) Filed: Oct. 30, 2020

(65) Prior Publication Data

US 2021/0119460 A1 Apr. 22, 2021

Related U.S. Application Data

(63) Continuation of application No. 16/089,373, filed as application No. PCT/CN2016/077621 on Mar. 29, 2016, now Pat. No. 10,826,310.

(51) Int. Cl.
*H02J 7/00* (2006.01)
*H04W 24/04* (2009.01)
(Continued)

(52) U.S. Cl.
CPC ............ *H02J 7/0047* (2013.01); *H04M 1/73* (2013.01); *H04W 24/04* (2013.01);
(Continued)

(58) Field of Classification Search
CPC ............. H02J 7/0068; H02J 13/00017; H02J 13/00002; H02J 13/00028;
(Continued)

(56) References Cited

U.S. PATENT DOCUMENTS 8,627,029 B2   1/2014 Mosek
9,606,706 B2   3/2017 Vyas et al.
(Continued)

FOREIGN PATENT DOCUMENTS

CN   102089731 A   6/2011
CN   102323900 A   1/2012
(Continued)

*Primary Examiner* — Binh C Tat

(57) ABSTRACT

A resource statistics collection method and apparatus, and a terminal are provided. The method includes: recording a process running on a terminal at each of at least two time points; for each of the time points, obtaining at least one hardware resource invoked by the process running at the time point; obtaining a process set including processes running at the at least two time points; and obtaining, according to the hardware resource invoked by the process in the process set, information about the at least one hardware resource occupied by an application associated with the process in the process set. In embodiments of the present invention, statistics collection is performed per process, so that information about the hardware resource occupied by each application of the terminal can be obtained, and a statistical granularity is relatively fine.

23 Claims, 9 Drawing Sheets

(51) Int. Cl.
*H04M 1/73* (2006.01)
*H04W 52/02* (2009.01)

(52) U.S. Cl.
CPC ....... *H04W 52/0261* (2013.01); *H02J 7/0048* (2020.01); *H04M 2250/12* (2013.01)

(58) Field of Classification Search
CPC ........... H02J 13/00006; H02J 13/00034; H02J 13/0017; H02J 13/0079; H02J 50/20; H02J 7/34; H02J 9/02; H02J 3/14; H02J 13/00; H02J 3/00; H02J 50/80; H02J 7/02; H02J 7/345; H02J 13/00036; H02J 2310/12; H02J 50/60; H02J 50/90; H02J 7/0047; H02J 7/0048; H02J 13/00001; H02J 13/00004; H02J 13/00022; H02J 13/0005; H02J 2203/20; H02J 2300/10; H02J 2300/22; H02J 2300/28; H02J 2300/30; H02J 3/0012; H02J 3/003; H02J 3/004; H02J 3/0075; H02J 3/06; H02J 3/32; H02J 3/381; H02J 5/00; H02J 50/27; H02J 7/007; H02J 7/04; H02J 7/35; H02J 9/062; H02J 9/068; B60M 1/00; B60M 7/00; H04L 12/66; H04L 29/00

USPC .................................................. 320/126–136
See application file for complete search history.

(56) References Cited

U.S. PATENT DOCUMENTS

| | | |
|---|---|---|
| 2011/0109613 A1 | 5/2011 | Asai et al. |
| 2012/0191476 A1* | 7/2012 | Reid ...................... G06Q 10/10 705/3 |
| 2012/0260179 A1 | 10/2012 | Reshadi et al. |
| 2015/0106509 A1 | 4/2015 | Lee et al. |
| 2016/0242001 A1 | 8/2016 | Dong et al. |
| 2017/0046357 A1* | 2/2017 | Cameron ................ A24F 40/30 |
| 2019/0369699 A1* | 12/2019 | Pathak ................ G06F 11/3409 |

FOREIGN PATENT DOCUMENTS

| | | |
|---|---|---|
| CN | 102508761 A | 6/2012 |
| CN | 102880540 A | 1/2013 |
| CN | 104660816 A | 5/2015 |
| EP | 2741211 A1 | 6/2014 |

* cited by examiner

RESOURCE STATISTICS COLLECTION METHOD AND APPARATUS AND TERMINAL

CROSS-REFERENCE TO RELATED APPLICATIONS

This application is a continuation of U.S. patent application Ser. No. 16/089,373, filed on Sep. 28, 2018, now U.S. patent Ser. No. 10/826,310. The U.S. patent application Ser. No. 16/089,373 is a national stage of International Application No. PCT/CN2016/077621, filed on Mar. 29, 2016. All of the aforementioned applications are hereby incorporated by reference in their entireties.

TECHNICAL FIELD

The present invention relates to the field of electronic technologies, and in particular, to a resource statistics collection method and apparatus, and a terminal.

BACKGROUND

With increasingly widespread use of a terminal, a user has an increasingly higher requirement on the terminal. To improve user experience and enrich terminal functions, the user installs various applications on the terminal, so that the user can use the various applications to implement various functions. However, in this case, the user uses the terminal for a longer time, the various applications on the terminal consume more power, and consequently, the terminal consumes power more quickly. Power consumption of the terminal is generally generated by occupying various hardware resources of the terminal. In the prior art, statistics collection is usually performed per user identifier (User ID, UID) on a power consumption status of the terminal. One UID generally includes multiple applications, and a status of occupying the hardware resource by each UID is finally obtained by means of statistics collection, that is, a general status of occupying the hardware resource by the multiple applications. A statistical granularity is relatively coarse, and provided information is not intuitive.

SUMMARY

Embodiments of the present invention provide a resource statistics collection method and apparatus. Statistics collection is performed per process, so that information about a hardware resource occupied by each application of a terminal can be obtained, and a statistical granularity is relatively fine.

A first aspect of the present invention provides a resource statistics collection method, including:

recording a process running on a terminal at each of at least two time points;

for each of the time points, obtaining at least one hardware resource invoked by the process running at the time point;

obtaining a process set including processes running at the at least two time points, where the process set includes one or more processes; and obtaining, according to the at least one hardware resource invoked by the process in the process set, information about the at least one hardware resource occupied by an application associated with the process in the process set. If the process set includes one process, the information about the at least one hardware resource occupied by the application associated with the process is obtained according to the at least one hardware resource invoked by the process; or if the process set includes multiple processes, the information about the at least one hardware resource occupied by the application associated with the multiple processes is obtained according to the at least one hardware resource invoked by each process in the multiple processes. The application associated with the multiple processes includes one or more applications.

In this manner, statistics collection is performed per process, so that information about the hardware resource occupied by each application of the terminal can be obtained, a user can accurately find an application that occupies more hardware resources, and relatively intuitive information is provided.

Based on the first aspect, in a first feasible implementation of the first aspect, the method further includes:

if a first occupation information obtaining request is received, obtaining a first process set including a process running within a first time period in a time period including the at least two time points, where the first occupation information obtaining request is used to request to obtain information about a hardware resource occupied within the first time period; and obtaining, according to the hardware resource invoked by the process in the first process set, information about the at least one hardware resource occupied within the first time period by a first application associated with the process in the first process set, where the first application associated with the application in the first process set may include one or more applications.

In this manner, the user may conveniently obtain information about the hardware resource occupied by the application within any time period, and intuitive information is provided.

Based on the first aspect, in a second feasible implementation of the first aspect, the method further includes:

if a second occupation information obtaining request is received, obtaining a second process set including a process associated with a second application, where the second occupation information obtaining request is used to request to obtain information about a hardware resource occupied by the second application within a second time period in a time period including the at least two time points; and obtaining, according to the hardware resource invoked by the process in the second process set within the second time period, information about the at least one hardware resource occupied by the second application within the second time period.

In this manner, the user may conveniently query a status of occupying the hardware resource by one or more applications, the method is easy to use for the user, and intuitive and accurate information is provided.

Based on the first aspect, in a third feasible implementation of the first aspect, the method further includes:

if a third occupation information obtaining request is received, obtaining a third process set including a process invoking a target hardware resource within a third time period in a time period including the at least two time points, where the third occupation information obtaining request is used to request to obtain information about the target hardware resource occupied within the third time period;

obtaining, according to information about invoking the target hardware resource by the process in the third process set within the third time period, the information about the target hardware resource occupied within the third time period by a third application associated with the process in the third process set, where the third application includes one or more applications; and outputting the information about the target hardware resource occupied and an identifier of the target hardware resource.

In this manner, the user may conveniently query a status of occupying one or more target hardware resources, and intuitive and accurate information is provided.

Based on any one of the first aspect to the third feasible implementation of the first aspect, in a fourth feasible implementation of the first aspect, the information about the hardware resource occupied includes at least one of information about a time point at which the hardware resource is occupied, information about a quantity of occupied hardware resources, or information about power consumption for occupying the hardware resource, so that the user can conveniently find information about occupying each hardware resource by various applications.

Based on the first aspect, in a fifth feasible implementation of the first aspect, if the information about the at least one hardware resource occupied by the application associated with the process in the process set includes information about a quantity of the at least one hardware resource occupied by the application, the obtaining, according to the at least one hardware resource invoked by the process in the process set, information about the at least one hardware resource occupied by an application associated with the process in the process set includes:

obtaining, according to the at least one hardware resource invoked by the process in the process set, a quantity of the at least one hardware resource occupied by the process in the process set; and obtaining, according to the quantity of the at least one hardware resource occupied by the process in the process set, the information about a quantity of the at least one hardware resource occupied by the application associated with the process in the process set.

In this manner, the magnitude of occupying the hardware resource by the process in the process set is further calculated, so as to determine the information about a quantity of occupied hardware resources by the application associated with the process in the process set. Statistics collection is performed per process, so that information about a quantity of occupied hardware resources by each application is accurately found.

Based on the first aspect, in a sixth feasible implementation of the first aspect, if the information about the at least one hardware resource occupied by the application associated with the process in the process set includes information about power consumption for the at least one hardware resource occupied by the application, the obtaining, according to the at least one hardware resource invoked by the process in the process set, information about the at least one hardware resource occupied by an application associated with the process in the process set includes:

obtaining, according to the at least one hardware resource invoked by the process in the process set, a quantity of the at least one hardware resource occupied by the process in the process set;

obtaining, according to the quantity of the at least one hardware resource occupied by the process in the process set and power of the hardware resource, information about power consumption for the at least one hardware resource occupied by the process in the process set; and obtaining, according to the information about power consumption for the at least one hardware resource occupied by the process in the process set, the information about power consumption for the at least one hardware resource occupied by the application associated with the process in the process set.

In this manner, the power consumption information about occupying each hardware resource by the process in the process set is calculated, so as to obtain power consumption of occupying the at least one hardware resource by the application associated with the process in the process set, so that the user conveniently and accurately determines a power consumption status of each application of the terminal.

Based on any one of the first aspect to the sixth feasible implementation of the first aspect, in a seventh feasible implementation of the first aspect, the method further includes:

for the process running at each of the time points, determining a running status type of the process, where the running status type includes foreground running or background running; and the obtaining, according to the at least one hardware resource invoked by the process in the process set, information about the at least one hardware resource occupied by an application associated with the process in the process set includes:

according to the hardware resource invoked by the process in the process set and the running status type of the process in the process set, separately collecting statistics on information about the at least one hardware resource occupied by the process in the process set when running in a foreground, and on information about the at least one hardware resource occupied by the process in the process set when running in a background;

obtaining, according to the information about the at least one hardware resource occupied by the process in the process set when running in the foreground, information about the at least one hardware resource occupied by the application that runs in the foreground and that is associated with the process in the process set; and obtaining, according to the information about the at least one hardware resource occupied by the process in the process set when running in the background, information about the at least one hardware resource occupied by the application that runs in the background and that is associated with the process in the process set.

In this manner, information about the hardware resource occupied by each application running in the foreground or running in the background may be accurately determined, so that the user conveniently knows a status of occupying the resource by each application when running in the foreground or the background.

Based on any one of the first aspect to the sixth feasible implementation of the first aspect, in an eighth feasible implementation of the first aspect, the method further includes:

for the process running at each of the time points, determining a terminal screen status at the time point, where the terminal screen status includes a screen-on state or a screen-off state; and the obtaining, according to the at least one hardware resource invoked by the process in the process set, information about the at least one hardware resource occupied by an application associated with the process in the process set includes:

according to the at least one hardware resource invoked by the process in the process set, separately collecting statistics on information about the at least one hardware resource occupied by the application associated with the process in the process set in the screen-on state, and on information about the at least one hardware resource occupied by the application associated with the process in the process set in the screen-off state.

In this manner, the user may conveniently determine a status of occupying the hardware resource by each application in the screen-on state or the screen-off state.

A second aspect of the present invention provides a resource statistics collection apparatus, including:

a recording module, configured to record a process running on a terminal at each of at least two time points;

a first obtaining module, configured to: for each of the time points, obtain at least one hardware resource invoked by the process running at the time point;

a second obtaining module, configured to obtain a process set including processes running at the at least two time points, where the process set includes one or more processes; and a third obtaining module, configured to obtain, according to the at least one hardware resource invoked by the process in the process set, information about the at least one hardware resource occupied by an application associated with the process in the process set. If the process set includes one process, the information about the at least one hardware resource occupied by the application associated with the process is obtained according to the at least one hardware resource invoked by the process; or if the process set includes multiple processes, the information about the at least one hardware resource occupied by the application associated with the multiple processes is obtained according to the at least one hardware resource invoked by each process in the multiple processes. The application associated with the multiple processes includes one or more applications.

In this manner, statistics collection is performed per process, so that information about the hardware resource occupied by each application of the terminal can be obtained, a user can accurately find an application that occupies more hardware resources, and relatively intuitive information is provided.

Based on the second aspect, in a first feasible implementation of the second aspect, the apparatus further includes:

a fourth obtaining module, configured to: if a first occupation information obtaining request is received, obtain a first process set including a process running within a first time period in a time period including the at least two time points, where the first occupation information obtaining request is used to request to obtain information about a hardware resource occupied within the first time period; and a fifth obtaining module, configured to obtain, according to the hardware resource invoked by the process in the first process set, information about the at least one hardware resource occupied within the first time period by a first application associated with the process in the first process set, where the first application associated with the application in the first process set may include one or more applications.

In this manner, the user may conveniently obtain information about the hardware resource occupied by the application within any time period, and intuitive information is provided.

Based on the second aspect, in a second feasible implementation of the second aspect, the apparatus further includes:

a sixth obtaining module, configured to: if a second occupation information obtaining request is received, obtain a second process set including a process associated with a second application, where the second occupation information obtaining request is used to request to obtain information about a hardware resource occupied by the second application within a second time period in a time period including the at least two time points; and a seventh obtaining module, configured to obtain, according to the hardware resource invoked by the process in the second process set within the second time period, information about the at least one hardware resource occupied by the second application within the second time period.

In this manner, the user may conveniently query a status of occupying the hardware resource by one or more applications, the method is easy to use for the user, and intuitive and accurate information is provided.

Based on the second aspect, in a third feasible implementation of the second aspect, the apparatus further includes:

an eighth obtaining module, configured to: if a third occupation information obtaining request is received, obtain a third process set including a process invoking a target hardware resource within a third time period in a time period including the at least two time points, where the third occupation information obtaining request is used to request to obtain information about the target hardware resource occupied within the third time period;

a ninth obtaining module, configured to obtain, according to information about invoking the target hardware resource by the process in the third process set within the third time period, the information about the target hardware resource occupied within the third time period by a third application associated with the process in the third process set, where the third application includes one or more applications; and an output module, configured to output the information about the target hardware resource occupied and an identifier of the target hardware resource.

In this manner, the user may conveniently query a status of occupying one or more target hardware resources, and intuitive and accurate information is provided.

Based on any one of the second aspect to the third feasible implementation of the second aspect, in a fourth feasible implementation of the second aspect, the information about the hardware resource occupied includes at least one of information about a time point at which the hardware resource is occupied, information about a quantity of occupied hardware resources, or information about power consumption for occupying the hardware resource, so that the user can conveniently find information about occupying each hardware resource by various applications.

Based on the second aspect, in a fifth feasible implementation of the second aspect, if the information about the at least one hardware resource occupied by the application associated with the process in the process set includes information about a quantity of the at least one hardware resource occupied by the application, that a third obtaining module obtains, according to the at least one hardware resource invoked by the process in the process set, information about the at least one hardware resource occupied by an application associated with the process in the process set specifically includes:

obtaining, according to the at least one hardware resource invoked by the process in the process set, a quantity of the at least one hardware resource occupied by the process in the process set; and obtaining, according to the quantity of the at least one hardware resource occupied by the process in the process set, the information about a quantity of the at least one hardware resource occupied by the application associated with the process in the process set.

In this manner, the magnitude of occupying the hardware resource by the process in the process set is further calculated, so as to determine the information about a quantity of occupied hardware resources by the application associated with the process in the process set. Statistics collection is performed per process, so that information about a quantity of occupied hardware resources by each application is accurately found.

Based on the second aspect, in a sixth feasible implementation of the second aspect, if the information about the at least one hardware resource occupied by the application associated with the process in the process set includes information about power consumption for the at least one hardware resource occupied by the application, that a third obtaining module obtains, according to the at least one hardware resource invoked by the process in the process set, information about the at least one hardware resource occupied by an application associated with the process in the process set specifically includes:

obtaining, according to the at least one hardware resource invoked by the process in the process set, a quantity of the at least one hardware resource occupied by the process in the process set;

obtaining, according to the quantity of the at least one hardware resource occupied by the process in the process set and power of the hardware resource, information about power consumption for the at least one hardware resource occupied by the process in the process set; and obtaining, according to the information about power consumption for the at least one hardware resource occupied by the process in the process set, the information about power consumption for the at least one hardware resource occupied by the application associated with the process in the process set.

In this manner, the power consumption information about occupying each hardware resource by the process in the process set is calculated, so as to obtain power consumption of occupying the at least one hardware resource by the application associated with the process in the process set, so that the user conveniently and accurately determines a power consumption status of each application of the terminal.

Based on any one of the second aspect to the sixth feasible implementation of the second aspect, in a seventh feasible implementation of the second aspect, the apparatus further includes a first determining module;

the first determining module is configured to: for the process running at each of the time points, determine a running status type of the process, where the running status type includes foreground running or background running; and that a third obtaining module obtains, according to the at least one hardware resource invoked by the process in the process set, information about the at least one hardware resource occupied by an application associated with the process in the process set specifically includes:

according to the hardware resource invoked by the process in the process set and the running status type of the process in the process set, separately collecting statistics on information about the at least one hardware resource occupied by the process in the process set when running in a foreground, and on information about the at least one hardware resource occupied by the process in the process set when running in a background;

obtaining, according to the information about the at least one hardware resource occupied by the process in the process set when running in the foreground, information about the at least one hardware resource occupied by the application that runs in the foreground and that is associated with the process in the process set; and obtaining, according to the information about the at least one hardware resource occupied by the process in the process set when running in the background, information about the at least one hardware resource occupied by the application that runs in the background and that is associated with the process in the process set.

In this manner, information about the hardware resource occupied by each application running in the foreground or running in the background may be accurately determined, so that the user conveniently knows a status of occupying the resource by each application when running in the foreground or the background.

Based on any one of the second aspect to the sixth feasible implementation of the second aspect, in an eighth feasible implementation of the second aspect, the apparatus further includes:

a second determining module, configured to: for the process running at each of the time points, determine a terminal screen status at the time point, where the terminal screen status includes a screen-on state or a screen-off state; and that a third obtaining module obtains, according to the at least one hardware resource invoked by the process in the process set, information about the at least one hardware resource occupied by an application associated with the process in the process set specifically includes:

according to the at least one hardware resource invoked by the process in the process set, separately collecting statistics on information about the at least one hardware resource occupied by the application associated with the process in the process set in the screen-on state, and on information about the at least one hardware resource occupied by the application associated with the process in the process set in the screen-off state.

In this manner, the user may conveniently determine a status of occupying the hardware resource by each application in the screen-on state or the screen-off state.

A third aspect of the embodiments of the present invention provides a terminal, including a processor, a storage, and at least one hardware resource, where the processor, the storage, and the at least one hardware resource are separately connected to a communications bus, a set of program code is stored in the storage, and the processor is configured to invoke the program code stored in the storage, so as to perform the following steps:

recording a process running on a terminal at each of at least two time points;

for each of the time points, obtaining at least one hardware resource invoked by the process running at the time point;

obtaining a process set including processes running at the at least two time points, where the process set includes one or more processes; and obtaining, according to the at least one hardware resource invoked by the process in the process set, information about the at least one hardware resource occupied by an application associated with the process in the process set. If the process set includes one process, the information about the at least one hardware resource occupied by the application associated with the process is obtained according to the at least one hardware resource invoked by the process; or if the process set includes multiple processes, the information about the at least one hardware resource occupied by the application associated with the multiple processes is obtained according to the at least one hardware resource invoked by each process in the multiple processes. The application associated with the multiple processes includes one or more applications.

In this manner, statistics collection is performed per process, so that information about the hardware resource occupied by each application of the terminal can be obtained, a user can accurately find an application that occupies more hardware resources, and relatively intuitive information is provided.

Based on the third aspect, in a first feasible implementation of the third aspect, the apparatus further includes an input apparatus, and the input apparatus is connected to the communications bus; and the processor is further configured to invoke the program code stored in the storage, so as to perform the following steps:

if a first occupation information obtaining request is received by using the input apparatus, obtaining a first process set including a process running within a first time period in a time period including the at least two time points, where the first occupation information obtaining request is used to request to obtain information about a hardware resource occupied within the first time period; and obtaining, according to the hardware resource invoked by the process in the first process set, information about the at least one hardware resource occupied within the first time period by a first application associated with the process in the first process set, where the first application associated with the application in the first process set may include one or more applications.

In this manner, the user may conveniently obtain information about the hardware resource occupied by the application within any time period, and intuitive information is provided.

Based on the third aspect, in a second feasible implementation of the third aspect, the apparatus further includes an input apparatus, and the input apparatus is connected to the communications bus; and the processor is further configured to invoke the program code stored in the storage, so as to perform the following steps:

if a second occupation information obtaining request is received by using the input apparatus, obtaining a second process set including a process associated with a second application, where the second occupation information obtaining request is used to request to obtain information about a hardware resource occupied by the second application within a second time period in a time period including the at least two time points; and obtaining, according to the hardware resource invoked by the process in the second process set within the second time period, information about the at least one hardware resource occupied by the second application within the second time period.

In this manner, the user may conveniently query a status of occupying the hardware resource by one or more applications, the method is easy to use for the user, and intuitive and accurate information is provided.

Based on the third aspect, in a third feasible implementation of the third aspect, the apparatus further includes an input apparatus and an output apparatus, and the input apparatus and the output apparatus are separately connected to the communications bus; and the processor is further configured to invoke the program code stored in the storage, so as to perform the following steps:

if a third occupation information obtaining request is received by using the input apparatus, obtaining a third process set including a process invoking a target hardware resource within a third time period in a time period including the at least two time points, where the third occupation information obtaining request is used to request to obtain information about the target hardware resource occupied within the third time period;

obtaining, according to information about invoking the target hardware resource by the process in the third process set within the third time period, the information about the target hardware resource occupied within the third time period by a third application associated with the process in the third process set, where the third application includes one or more applications; and outputting the information about the target hardware resource occupied and an identifier of the target hardware resource.

In this manner, the user may conveniently query a status of occupying one or more target hardware resources, and intuitive and accurate information is provided.

Based on any one of the third aspect to the third feasible implementation of the third aspect, in a fourth feasible implementation of the third aspect, the information about the hardware resource occupied includes at least one of information about a time point at which the hardware resource is occupied, information about a quantity of occupied hardware resources, or information about power consumption for occupying the hardware resource, so that the user can conveniently find information about occupying each hardware resource by various applications.

Based on the third aspect, in a fifth feasible implementation of the third aspect, if the information about the at least one hardware resource occupied by the application associated with the process in the process set includes information about a quantity of the at least one hardware resource occupied by the application, the obtaining, according to the at least one hardware resource invoked by the process in the process set, information about the at least one hardware resource occupied by an application associated with the process in the process set includes:

obtaining, according to the at least one hardware resource invoked by the process in the process set, a quantity of the at least one hardware resource occupied by the process in the process set; and obtaining, according to the quantity of the at least one hardware resource occupied by the process in the process set, the information about a quantity of the at least one hardware resource occupied by the application associated with the process in the process set.

In this manner, the magnitude of occupying the hardware resource by the process in the process set is further calculated, so as to determine the information about a quantity of occupied hardware resources by the application associated with the process in the process set. Statistics collection is performed per process, so that information about a quantity of occupied hardware resources by each application is accurately found.

Based on the third aspect, in a sixth feasible implementation of the third aspect, if the information about the at least one hardware resource occupied by the application associated with the process in the process set includes information about power consumption for the at least one hardware resource occupied by the application, the obtaining, according to the at least one hardware resource invoked by the process in the process set, information about the at least one hardware resource occupied by an application associated with the process in the process set includes:

obtaining, according to the at least one hardware resource invoked by the process in the process set, a quantity of the at least one hardware resource occupied by the process in the process set;

obtaining, according to the quantity of the at least one hardware resource occupied by the process in the process set and power of the hardware resource, information about power consumption for the at least one hardware resource occupied by the process in the process set; and obtaining, according to the information about power consumption for the at least one hardware resource occupied by the process in the process set, the information about power consumption for the at least one hardware resource occupied by the application associated with the process in the process set.

In this manner, the power consumption information about occupying each hardware resource by the process in the process set is calculated, so as to obtain power consumption of occupying the at least one hardware resource by the application associated with the process in the process set, so that the user conveniently and accurately determines a power consumption status of each application of the terminal.

Based on any one of the third aspect to the sixth feasible implementation of the third aspect, in a seventh feasible implementation of the third aspect, the processor is further configured to invoke the program code stored in the storage, so as to perform the following step:

for the process running at each of the time points, determining a running status type of the process, where the running status type includes foreground running or background running; and the obtaining, by the processor according to the at least one hardware resource invoked by the process in the process set, information about the at least one hardware resource occupied by an application associated with the process in the process set includes:

according to the hardware resource invoked by the process in the process set and the running status type of the process in the process set, separately collecting statistics on information about the at least one hardware resource occupied by the process in the process set when running in a foreground, and on information about the at least one hardware resource occupied by the process in the process set when running in a background;

obtaining, according to the information about the at least one hardware resource occupied by the process in the process set when running in the foreground, information about the at least one hardware resource occupied by the application that runs in the foreground and that is associated with the process in the process set; and obtaining, according to the information about the at least one hardware resource occupied by the process in the process set when running in the background, information about the at least one hardware resource occupied by the application that runs in the background and that is associated with the process in the process set.

In this manner, information about the hardware resource occupied by each application running in the foreground or running in the background may be accurately determined, so that the user conveniently knows a status of occupying the resource by each application when running in the foreground or the background.

Based on any one of the third aspect to the sixth feasible implementation of the third aspect, in an eighth feasible implementation of the third aspect, the processor is further configured to invoke the program code stored in the storage, so as to perform the following step:

for the process running at each of the time points, determining a terminal screen status at the time point, where the terminal screen status includes a screen-on state or a screen-off state; and the obtaining, by the processor according to the at least one hardware resource invoked by the process in the process set, information about the at least one hardware resource occupied by an application associated with the process in the process set includes:

according to the at least one hardware resource invoked by the process in the process set, separately collecting statistics on information about the at least one hardware resource occupied by the application associated with the process in the process set in the screen-on state, and on information about the at least one hardware resource occupied by the application associated with the process in the process set in the screen-off state.

In this manner, the user may conveniently determine a status of occupying the hardware resource by each application in the screen-on state or the screen-off state.

A fourth aspect of the present invention provides a computer storage medium, the computer storage medium stores a program, and the program specifically includes an instruction for executing some or all steps of any method in the first aspect of the embodiments of the present invention.

In the embodiments of the present invention, the process running on the terminal at each of the at least two time points is recorded; for each of the time points, the at least one hardware resource invoked by the process running at the time point is obtained; the process set including processes running at the at least two time points is obtained, where the process set includes one or more processes; and the information about the at least one hardware resource occupied by the application associated with the process in the process set is obtained according to the at least one hardware resource invoked by the process in the process set. In this manner, statistics collection is performed per process, so that information about the at least one hardware resource occupied by each application can be accurately found, and relatively intuitive information is provided.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
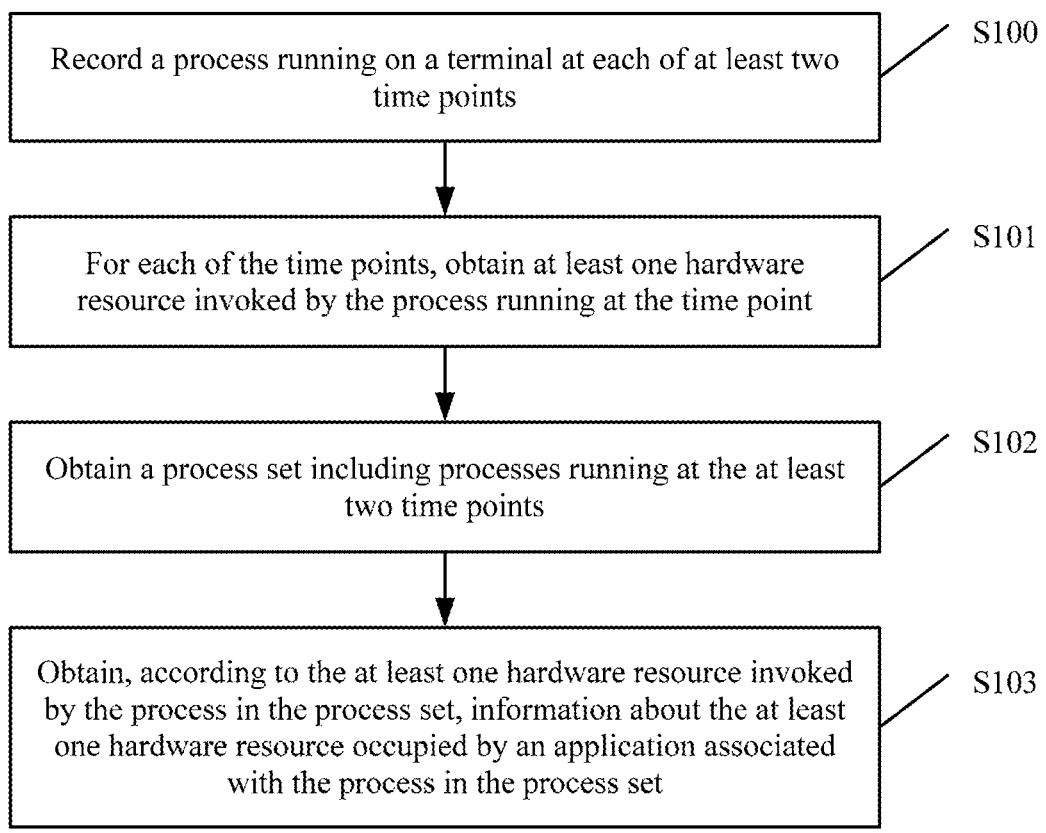
FIG. 1 is a schematic flowchart of a resource statistics collection method according to an embodiment of the present invention.

The following describes the technical solutions in the embodiments of the present invention with reference to the accompanying drawings in the embodiments of the present invention.

In the specification, claims, and accompanying drawings of the present invention, the terms "first", "second", "third", and so on are intended to distinguish between different objects but do not indicate a particular order. In addition, the terms "including" or any other variant thereof are intended to cover a non-exclusive inclusion. For example, a process, a method, a system, a product, or a device that includes a series of steps or modules is not limited to the listed steps or modules, but optionally further includes an unlisted step or module, or optionally further includes another inherent step or unit of the process, the method, the product, or the device.

A resource statistics collection apparatus disclosed in the present invention may be used as a separate apparatus, or integrated in various terminals, such as a mobile phone, a tablet personal computer (Tablet Personal Computer), a laptop computer (Laptop Computer), a multimedia player, a digital camera, a personal digital assistant (personal digital assistant, PDA for short), a mobile Internet device (Mobile Internet Device, MID), or a wearable device (Wearable Device).

A hardware resource in the embodiments of the present invention includes but is not limited to a touch panel, a microphone, a central processing unit (Central Processing Unit, CPU), a wireless local area network (Wireless Local Area Networks, WLAN) module, a Bluetooth module, a global positioning system (Global Positioning System, GPS) module, a liquid crystal display (Liquid Crystal Display, LCD), and the like.

In the embodiments of the present invention, information about the hardware resource occupied includes but is not limited to at least one of information about a time point at which the hardware resource is occupied, information about a quantity of occupied hardware resources, or information about power consumption for occupying the hardware resource. It should be noted that the information about a quantity of occupied hardware resources may be occupation duration of occupying the hardware resource.

In the embodiments of the present invention, an existing resource statistics collection algorithm is improved, so that more and finer information about the occupied hardware resource may be obtained (for example, in the embodiments of the present invention, various types of information about the hardware resource occupied by each application may be obtained, and the information includes but is not limited to a time point, a quantity, power consumption, and the like).

According to the existing resource statistics collection algorithm, statistics collection is performed per UID, and statistics collection is usually performed on power consumption of the occupied hardware resource. One UID includes multiple applications, one application includes multiple processes, and each process is identified by using a process identifier (Process ID, PID). Power consumption that is of occupying each hardware resource and that is generated during running of a process is included in power consumption corresponding to a UID associated with the process. A result obtained by performing statistics collection in such a way is that a terminal may finally output total power consumption that is of occupying hardware and that is corresponding to a UID, but power consumption that is of occupying the hardware resource by each application cannot be obtained, and applications occupying the hardware resource and generating power consumption at each time point cannot be learned either. However, a main purpose of a user is to find an application that consumes most power, and the purpose cannot be achieved according to the existing resource statistics collection algorithm.

In the embodiments of the present invention, to resolve the foregoing problem, in a resource statistics collection process, statistics collection is performed per PID, and a process running at each time point and at least one hardware resource invoked by the process are recorded. Statistics collection is performed on the process running at each time point and on the hardware resource invoked by each process, so that various types of information about occupying each hardware resource by each application in at least one application associated with each process may be obtained by means of statistics collection. For example, information about total power consumption of the terminal may be obtained (that is, information about a sum of power consumption of the hardware resource occupied by all processes); or which application occupies which hardware resources at each time point may be learned (that is, occupying the hardware resource by a process running at the time point is used as occupying the hardware resource at the time point by an application associated with the process); or a time period may be selected, and which applications occupy which hardware resources within the time period may be learned (that is, at least one process running within the time period is obtained, and a hardware resource invoked by the at least one process running within the time period is used as each hardware resource occupied within the time period by an application associated with the at least one process); or detailed information about a hardware resource occupied by each application may be obtained (that is, a PID of each process occupying the hardware resource is obtained, and detailed information about a hardware resource occupied by an application associated with each process may be obtained according to the application associated with each process), or the like.

In the embodiments of the present invention, statistics collection is performed per process, and the process running at each time point and the at least one hardware resource invoked by each process are recorded, so that the various types of information about the occupied hardware resource may be obtained. The information includes but is not limited to content mentioned in the embodiments of the present invention, and all information obtained by performing statistics collection per PID falls within a protection scope of the present invention.

Referring to FIG. 1, FIG. 1 is a schematic flowchart of a resource statistics collection method according to an embodiment of the present invention. As shown in the figure, the resource statistics collection method in this embodiment includes steps S100 to S102.

S100. Record a process running on a terminal at each of at least two time points.

In this embodiment of the present invention, the time point is a moment, and is an instant in terms of time, or is a point on a timeline. For example, 8:40 is a time point. In the present invention, statistics collection is performed per process on the process running on the terminal at each of the at least two time points.

Specifically and optionally, an identifier PID of a process running on the terminal is obtained once every specific time interval. The time interval needs to be determined according to running time of each process. For example, the PID of the process running on the terminal may be obtained once every 1 ms, and a PID that is of the process running on the terminal and that is obtained at each time point is recorded. If this recording manner is used, process PIDs at multiple time points may be the same. Alternatively, a recording manner may be: During running of each process in a system, a system service provides notification of a PID of the running process, and a correspondence between a corresponding time point and the process PID is automatically recorded. If this recording manner is used, a PID of a process running at each time point is different, and a difference between two time points is running duration of the process this time.

Figure 5:
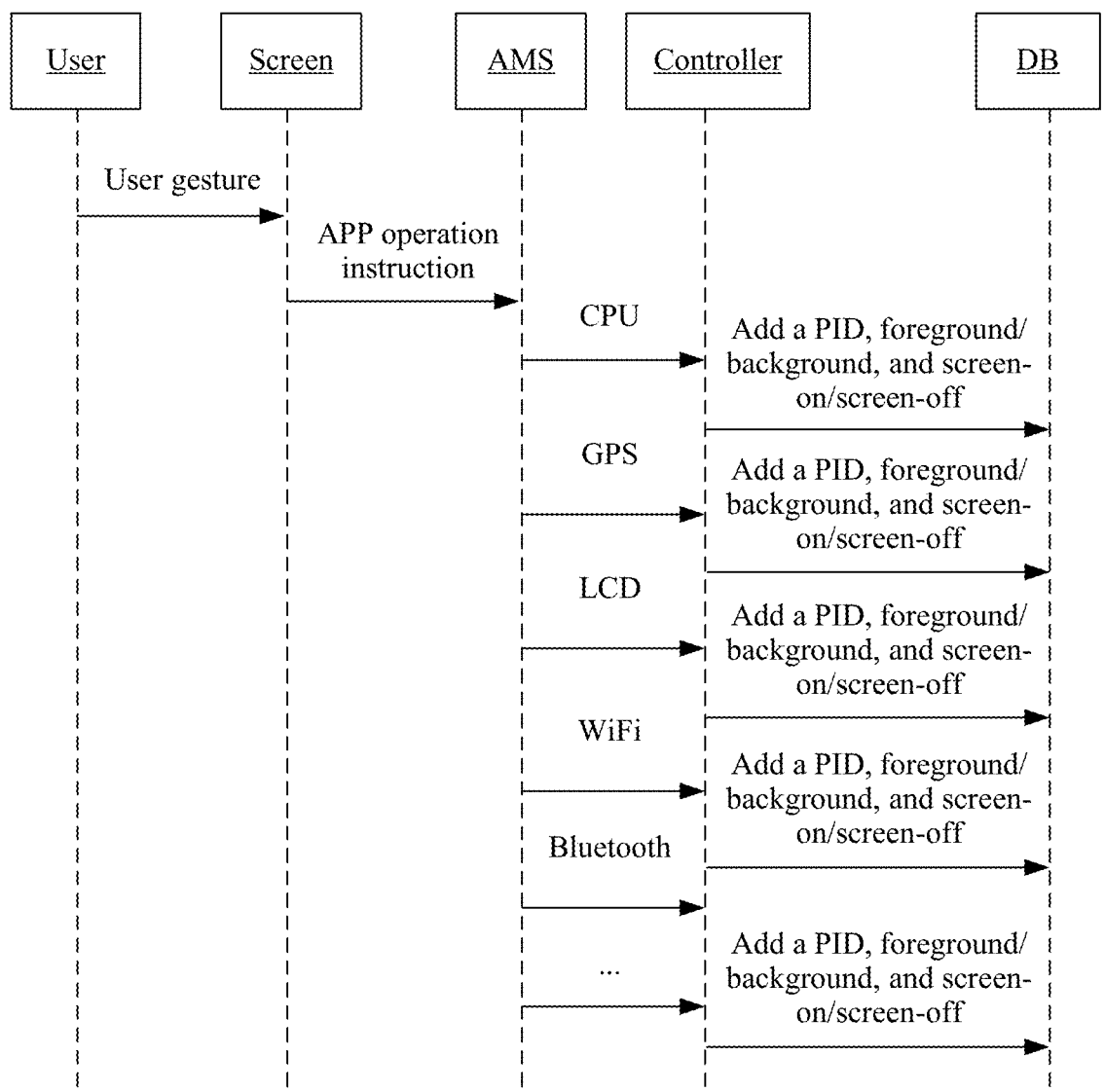
FIG. 5 is a diagram of information exchange in a terminal according to an embodiment of the present invention.
Figure 6:
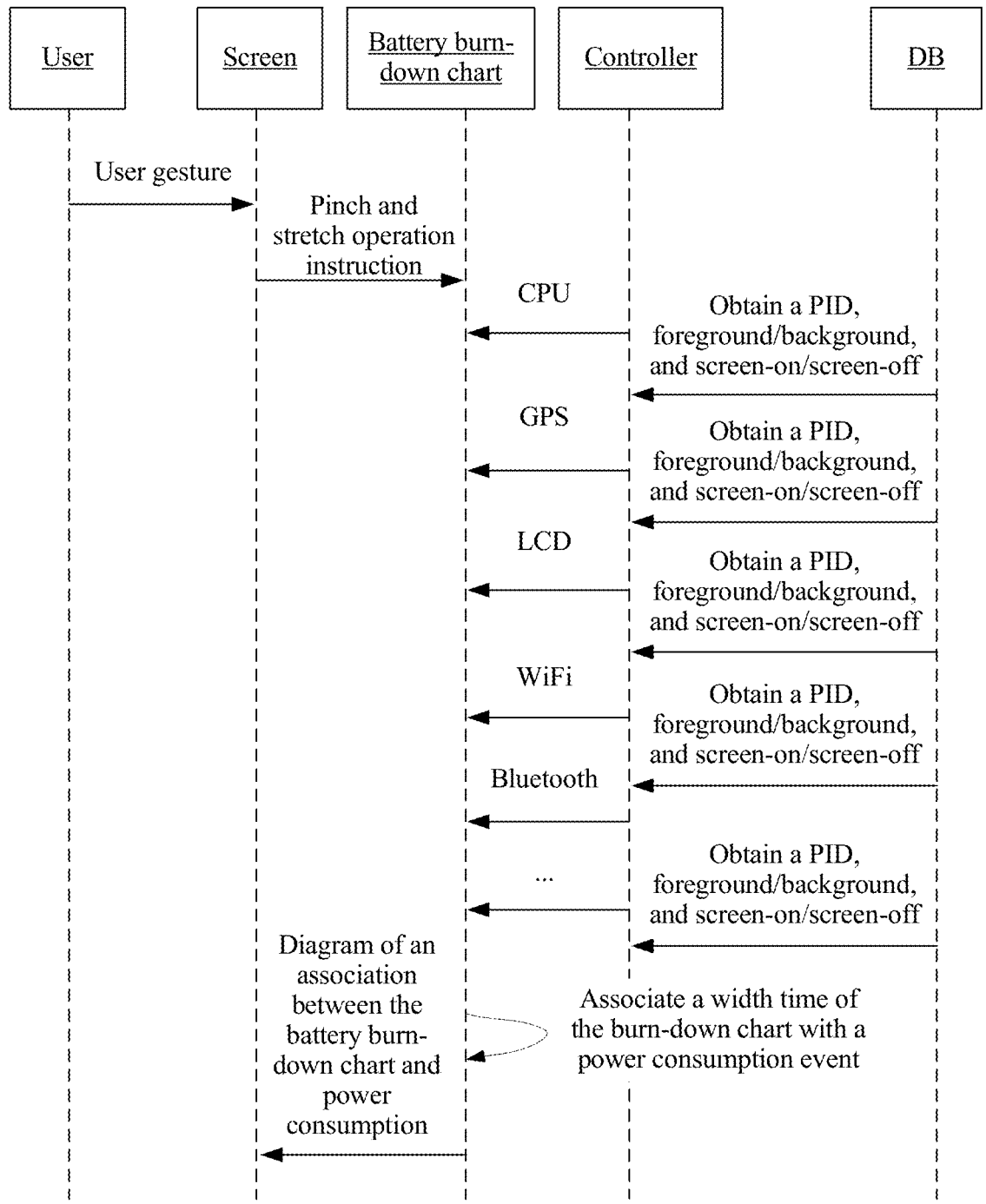
FIG. 6 is a diagram of internal information exchange of a battery burn-down chart according to an embodiment of the present invention.

Optionally, an Android system is used as an example. An activity manager service (activity manager service, AMS) in the Android system may schedule all processes and hardware resources. As shown in FIG. 5, when a user operates an application APP on a screen by using a gesture, the gesture is converted into an APP operation instruction, and the APP operation instruction is transmitted to the AMS. The AMS schedules a corresponding process and simultaneously instructs a power manager to record a PID of a process running on the terminal, and the power manager automatically stores a correspondence between each time point and a PID of a running process in a storage unit. A specific storage method may be adding the PID to the storage unit.

It should be noted that a controller may further obtain a terminal screen status during running of the process, for example, screen-on or screen-off; or the controller may further obtain a running status of the process, for example, foreground running or background running. Accordingly, the terminal screen status and/or the running status obtained by the controller are/is also stored in the storage unit.

S101. For each of the time points, obtain at least one hardware resource invoked by the process running at the time point.

In this embodiment of the present invention, for each time point, the at least one hardware resource invoked by the process running at the time point further needs to be obtained. At least one hardware resource may be invoked during running of one process, and the hardware resource includes but is not limited to a CPU, a WLAN module, a Bluetooth module, a global positioning system (Global Positioning System, GPS) module, a liquid crystal display (Liquid Crystal Display, LCD), a camera module, and the like.

Further, the at least one hardware resource invoked by the process running at each time point is also stored. For example, at a time point, a process A invokes the CPU and the GPS module, and a correspondence among the time point, the process A, and the hardware resource (the CPU and the GPS module) is stored in the storage unit accordingly.

S102. Obtain a process set including processes running at the at least two time points, where the process set includes one or more processes.

In this embodiment of the present invention, all process PIDs recorded at the at least two time points are managed by using a set, and the process set includes one or more processes. It should be noted that when all the process PIDs recorded at the at least two time points are the same, the process set includes one process.

S103. Obtain, according to the at least one hardware resource invoked by the process in the process set, information about the at least one hardware resource occupied by an application associated with the process in the process set.

In this embodiment of the present invention, if the process set includes one process, the information about the at least one hardware resource occupied by the application associated with the process is obtained according to the at least one hardware resource invoked by the process; or if the process set includes multiple processes, the information about the at least one hardware resource occupied by the application associated with the multiple processes is obtained according to the at least one hardware resource invoked by each process in the process set. It should be noted that the application associated with the multiple processes includes one or more applications.

In this embodiment of the present invention, the application is any application installed on the terminal, and includes but is not limited to a browser, an email, an instant messaging service, word processing, keyboard virtualization, a widget (Widget), encryption, digital copyright management, speech recognition, speech reproduction, positioning and navigation (for example, a function provided by a global positioning system), music playback, or the like. It should be noted that running of each application is based on running of each process of the application.

The information about the at least one hardware resource occupied by the application associated with the process in the process set may be obtained by means of statistics collection according to the hardware resource invoked by the process in the process set. Specifically and optionally, information about occupying each hardware resource by all processes associated with an application is determined as information about occupying each hardware resource by the application.

Optionally, the information about the at least one hardware resource occupied by the application includes time point information about the at least one hardware resource occupied by the application (that is, time points at which a corresponding hardware resource is occupied), the information about the at least one hardware resource occupied by the application includes information about a quantity of the at least one hardware resource occupied by the application (that is, total duration in which an application occupies a corresponding hardware resource), or the information about the at least one hardware resource occupied by the application includes information about power consumption for occupying the hardware resource by the application (that is, power consumption generated by a corresponding hardware resource occupied by an application, where the power consumption is associated with a power consumption status of the terminal), or the like.

It should be noted that when statistics collection is performed on information about the hardware resource occupied by each application, statistics collection may be performed on information about occupying each hardware resource by each application, for example, information about occupying the CPU by an application A and information about occupying the GPS by the application A.

Optionally, if the information about the at least one hardware resource occupied by the application associated with the process in the process set includes information about a quantity of the at least one hardware resource occupied by the application, the obtaining, according to the at least one hardware resource invoked by the process in the process set, information about the at least one hardware resource occupied by an application associated with the process in the process set may include the following steps S10 and S11.

S10. Obtain, according to the at least one hardware resource invoked by the process in the process set, a quantity of the at least one hardware resource occupied by the process in the process set.

In this embodiment of the present invention, if statistics collection needs to be performed on the magnitude information about occupying each hardware resource by the application associated with the process in the process set, statistics collection may be performed according to the stored process running at the at least two time points (there is one or more processes) and the at least one hardware resource invoked by each process, to obtain a quantity of the at least one hardware resource occupied by each process. If there is one hardware resource, the magnitude is a magnitude of occupying the hardware resource; or if there are multiple hardware resources, the magnitude may be a magnitude of occupying all of the multiple hardware resources.

It should be noted that the magnitude of occupying the hardware resource by each process may be duration of occupying the hardware resource. For example, for a process, a magnitude of occupying a hardware resource by the process may be obtained by adding up all time in which the process occupies the hardware resource.

S11. Obtain, according to the quantity of the at least one hardware resource occupied by the process in the process set, the information about a quantity of the at least one hardware resource occupied by the application associated with the process in the process set.

In this embodiment of the present invention, there may be one or more applications associated with the process in the process set, and magnitude information about a hardware resource occupied by each process is determined as a magnitude of occupying the hardware resource by an application associated with the process.

For example, for an application, magnitude information about a hardware resource occupied by the application may be obtained by adding up magnitudes of occupying the hardware resource by all processes of the application. For example, an application A includes a process a and a process b. When magnitude information about occupying the CPU by the application A is calculated, a magnitude of occupying the CPU by the process a and a magnitude of occupying the CPU by the process b may be added up, to obtain the magnitude information about occupying the CPU by the application A. A manner for calculating a magnitude of occupying another hardware resource by the application A is the same, and details are not described herein.

Optionally, if the information about the at least one hardware resource occupied by the application associated with the process in the process set includes information about power consumption for the at least one hardware resource occupied by the application, the obtaining, according to the at least one hardware resource invoked by the process in the process set, information about the at least one hardware resource occupied by an application associated with the process in the process set includes the following steps S12 to S14.

S12. Obtain, according to the at least one hardware resource invoked by the process in the process set, a quantity of the at least one hardware resource occupied by the process in the process set.

For this step in this embodiment of the present invention, refer to step S10. Details are not described herein.

S13. Obtain, according to the quantity of the at least one hardware resource occupied by the process in the process set and power of the hardware resource, information about power consumption for the at least one hardware resource occupied by the process in the process set.

In this embodiment of the present invention, the information about power consumption for the at least one hardware resource occupied by the process in the process set may be calculated according to the quantity of the at least one hardware resource occupied by the process in the process set and power of each hardware resource. A magnitude of occupying a hardware resource is duration of occupying the hardware resource, and a calculation manner for calculating power consumption information about a hardware resource occupied by a process may be multiplying a magnitude of occupying the hardware resource by the process by power of the hardware resource, to obtain the information about power consumption for occupying the hardware resource by the process.

S14. Obtain, according to the information about power consumption for the at least one hardware resource occupied by the process in the process set, the information about power consumption for the at least one hardware resource occupied by the application associated with the process in the process set.

In this embodiment of the present invention, the information about power consumption for the at least one hardware resource occupied by the application associated with the process in the process set may be obtained according to the information about power consumption for the at least one hardware resource occupied by the process in the process set. A specific calculation manner may be determining power consumption information about a hardware resource occupied by a process as power consumption of the hardware resource occupied by an application associated with the process. Further, a sum of power consumption of each hardware occupied resource occupied by all processes associated with an application is power consumption of each hardware occupied resource occupied by the application.

It should be noted that power consumption of each hardware occupied resource occupied by each application may intuitively reflect a power consumption status of the application.

Further, optionally, the user may initiate various hardware resource occupation information obtaining requests to the terminal. In this embodiment of the present invention, the following three optional occupation information obtaining requests are used as examples for description. Certainly, this imposes no limitation on a protection scope of the present invention.

In a first optional implementation, the occupation information obtaining request is a first occupation information obtaining request, and the following steps S15 and S16 are included.

S15. If the first occupation information obtaining request is received, obtain a first process set including a process running within a first time period in a time period including the at least two time points, where the first occupation information obtaining request is used to request to obtain information about a hardware resource occupied within the first time period.

S16. Obtain, according to the hardware resource invoked by the process in the first process set, information about the at least one hardware resource occupied within the first time period by a first application associated with the process in the first process set.

Specifically and optionally, if the first occupation information obtaining request is received (the first occupation information obtaining request is used to request to obtain the information about occupying the hardware resource within the first time period, and the first time period is a part or all of the time period including the at least two time points), the first process set including the process running within the first time period is obtained. The first process set includes one or more processes.

If the first process set includes one process, the information about the at least one hardware resource occupied within the first time period by the application associated with the process is obtained according to the hardware resource invoked by the process; or if the first process set includes multiple processes, the information about the at least one hardware resource occupied within the first time period by the first application (the first application includes one or more applications) associated with the multiple processes is obtained according to the hardware resource invoked by each of the multiple processes. The information about the hardware resource occupied includes at least one of information about a time point at which the hardware resource is occupied, information about a quantity of occupied hardware resources, or information about power consumption for occupying the hardware resource.

For example, if the user needs to obtain a status of occupying a hardware resource within a first time period 8:00 to 8:30, multiple processes running within the time period 8:00 to 8:30 may be obtained. Each process invokes at least one hardware resource, and a corresponding hardware resource occupied by each process is used as the corresponding hardware resource occupied by an application associated with the process.

For example, the hardware resource includes a CPU, a Bluetooth module, and a GPS; the information about the hardware resource occupied includes power consumption of the occupied hardware resource (certainly, the information is not limited to power consumption and may also be other information, and the power consumption is used as an example herein); and the multiple processes running within the time period 8:00 to 8:30 include a process 1, a process 2, a process 3, and a process 4. Power consumption of the CPU occupied by the process 1 is 2, power consumption of occupying the Bluetooth module by the process 1 is 2, power consumption of the CPU occupied by the process 2 is 3, power consumption of the CPU occupied by the process 3 is 8, power consumption of the CPU occupied by the process 4 is 2, power consumption of the CPU occupied by the process 3 is 8, power consumption of occupying the Bluetooth by the process 3 is 1, power consumption of occupying the GPS by the process 3 is 2, and power consumption of the CPU occupied by the process 4 is 2. The process 1 and the process 2 are associated with an application A, the process 3 is associated with an application B, and the process 4 is associated with an application C. Finally obtained power consumption of the CPU occupied by the application A is 5, and power consumption of occupying the Bluetooth by the application A is 2; power consumption of the CPU occupied by the application B is 8, power consumption of occupying the Bluetooth by the application B is 1, and power consumption of occupying the GPS by the application B is 2; and power consumption of the CPU occupied by the application C is 2. It can be learned from above that according to this embodiment of the present invention, applications that occupy each hardware resource and therefore generate power consumption within the time period 8:00 to 8:30 can be clearly reflected.

Further, the information about the occupied hardware resource may further include information about a time point at which the hardware resource is occupied (that is, an application that occupies a corresponding hardware resource at each time point is reflected). Description is given by still using time point information about the at least one hardware resource occupied within the foregoing time period 8:00 to 8:30 as an example. A status of occupying the hardware resource by the application associated with the process running at each time point may be obtained by using the recorded multiple processes running within the time period 8:00 to 8:30 and a status of invoking the at least one hardware resource by the multiple processes. For example, it is finally obtained by means of statistics collection that the application A occupies the CPU and the Bluetooth during 8:00 to 8:10, the application B occupies the CPU, the Bluetooth, and the GPS during 8:15 to 8:20, and the application C occupies the CPU during 8:20 to 8:30.

It may be understood that the information about the occupied hardware resource may further include information about a quantity of occupied hardware resources. The quantity information is duration of the occupied hardware resource, and a specific calculation manner is not described herein.

In a second optional implementation, the occupation information obtaining request is a second occupation information obtaining request, and the following steps S17 and S18 are included.

S17. If the second occupation information obtaining request is received, obtain a second process set including a process associated with a second application, where the second occupation information obtaining request is used to request to obtain information about a hardware resource occupied by the second application within a second time period in a time period including the at least two time points.

S18. Obtain, according to the hardware resource invoked by the process in the second process set within the second time period, information about the at least one hardware resource occupied by the second application within the second time period.

Specifically and optionally, if the second occupation information obtaining request is received (the second occupation information obtaining request is used to request to obtain the information about occupying the hardware resource within the second time period by the second application, and the second time period is a part or all of the time period including the at least two time points), the second process set including the process associated with the second application is obtained. The second process set includes one or more processes.

If the second process set includes one process, the information about the at least one hardware resource occupied within the second time period by the second application is obtained according to the hardware resource invoked by the process; or if the second process set includes multiple processes, the information about the at least one hardware resource occupied within the second time period by the second application is obtained according to the hardware resource invoked by each of the multiple processes. The information about the hardware resource occupied includes at least one of information about a time point at which the hardware resource is occupied, information about a quantity of occupied hardware resources, or information about power consumption for occupying the hardware resource.

For example, if the user needs to obtain a status of occupying a hardware resource by an application A within a second time period 8:00 to 8:30, a second process set (the second process set includes one or more processes) including a process associated with the application A is obtained, and information about at least one hardware resource occupied by the application A within 8:00 to 8:30 may be obtained according to a status of invoking the hardware resource within the second time period by the process in the second process set. One process invokes at least one hardware resource, and a corresponding hardware resource occupied by the process is used as the corresponding hardware resource occupied by an application associated with the process.

For example, the hardware resource includes a CPU, a Bluetooth module, and a GPS; the information about the hardware resource occupied includes power consumption of the occupied hardware resource (certainly, the information is not limited to power consumption and may also be other information, and the power consumption is used as an example herein); and the application A includes a process 1 and a process 2. Within the time period 8:00 to 8:30, power consumption of the CPU occupied by the process 1 is 2, power consumption of occupying the Bluetooth by the process 1 is 2, and power consumption of the CPU occupied by the process 2 is 3. Therefore, power consumption of the CPU occupied by the application A is 5, and power consumption of occupying the Bluetooth by the application A is 2.

Further, the information about the occupied hardware resource may further include information about a time point at which the hardware resource is occupied (that is, which hardware resources are occupied by the application A at which time points is reflected). Description is given by still using time point information about the at least one hardware resource occupied within the foregoing time period 8:00 to 8:30 as an example. It is recorded that within the time period 8:00 to 8:30, the process 1 of the application A occupies the CPU and the Bluetooth during 8:00 to 8:05, and the process 2 occupies the CPU during 8:05 to 8:10. Therefore, it can be learned that the application A occupies the CPU during 8:00 to 8:10, and occupies the Bluetooth during 8:00 to 8:05.

It may be understood that the information about the occupied hardware resource may further include information about a quantity of occupied hardware resources. The quantity information is duration of the occupied hardware resource, and a specific calculation manner is not described herein.

In a third optional implementation, the occupation information obtaining request is a third occupation information obtaining request, and the following steps S19 to S21 are included.

S19. If the third occupation information obtaining request is received, obtain a third process set including a process invoking a target hardware resource within a third time period in a time period including the at least two time points, where the third occupation information obtaining request is used to request to obtain information about the target hardware resource occupied within the third time period.

S20. Obtain, according to information about invoking the target hardware resource by the process in the third process set within the third time period, the information about the target hardware resource occupied within the third time period by a third application associated with the process in the third process set.

S21. Output the information about the target hardware resource occupied and an identifier of the target hardware resource.

Specifically and optionally, if the third occupation information obtaining request is received (the third occupation information obtaining request is used to request to obtain the information about the target hardware resource occupied within the third time period; the information about the occupied target hardware resource includes but is not limited to applications that occupy the target hardware resource within the third time period, or total power consumption generated by occupying the target hardware resource within the third time period, or the like; and the third time period is a part or all of the time period including the at least two time points), the third process set including the process invoking the target hardware resource within the third time period is obtained. The third process set includes one or more processes.

If the third process set includes one process, the information about the at least one hardware resource occupied within the third time period by the application associated with the process is obtained according to the hardware resource invoked by the process; or if the third process set includes multiple processes, the information about the at least one hardware resource occupied within the third time period by the third application (the third application includes one or more applications) associated with the multiple processes is obtained according to the hardware resource invoked by each of the multiple processes. The information about the hardware resource occupied includes at least one of information about a time point at which the hardware resource is occupied, information about a quantity of occupied hardware resources, or information about power consumption for occupying the hardware resource.

For example, if the user needs to obtain a status of occupying a target hardware resource CPU within a third time period 8:00 to 8:30, a third process set (the third process set includes one or more processes) including a process invoking the CPU within the time period 8:00 to 8:30 is obtained. For example, within the time period 8:00 to 8:30, the process invoking the CPU includes a process 1, a process 2, a process 3, and a process 4. Power consumption of the CPU occupied by the process 1 is 2, power consumption of the CPU occupied by the process 2 is 3, power consumption of the CPU occupied by the process 3 is 8, and power consumption of the CPU occupied by the process 4 is 2. The process 1 and the process 2 are associated with an application A, the process 3 is associated with an application B, and the process 4 is associated with an application C. Therefore, it can be learned that power consumption of the CPU occupied by the application A is 5, power consumption of the CPU occupied by the application B is 8, and power consumption of the CPU occupied by the application C is 2. According to this embodiment of the present invention, power consumption generated by the hardware resource CPU occupied by each application within the time period 8:00 to 8:30 can be clearly reflected.

It should be noted that the power consumption information and a resource identifier of the CPU may be output, to make the user clearly know the power consumption of the CPU occupied by each application.

Further, calculation may be performed on each hardware resource in the foregoing power consumption calculation manner for the target resource, so as to obtain a power consumption status of each hardware resource, and output an identifier of each hardware resource.

It should be noted that a sum of power consumption of all hardware resources may be used as a status of total power consumption of the terminal within the third time period.

Further, the information about the occupied hardware resource may further include information about a time point at which the hardware resource is occupied (that is, which applications occupy the target hardware resource at which time points is reflected). Description is given by still using the foregoing information about the target hardware resource occupied within the time period 8:00 to 8:30 as an example. By using the recorded multiple processes (the process 1, the process 2, the process 3, and the process 4) occupying the target hardware resource CPU within the time period 8:00 to 8:30, it can be learned that the application A associated with the process 1 and the process 2 occupies the target hardware resource CPU during 8:00 to 8:10, the application B associated with the process 3 occupies the target hardware resource CPU during 8:15 to 8:20, and the application C associated with the process 4 occupies the target hardware resource CPU during 8:20 to 8:30.

It may be understood that the information about the occupied hardware resource may further include information about a quantity of occupied hardware resources. The quantity information is duration of the occupied hardware resource, and a specific calculation manner is not described herein.

In this embodiment of the present invention, the process running on the terminal at each of the at least two time points is recorded; for each of the time points, the at least one hardware resource invoked by the process running at the time point is obtained; the process set including processes running at the at least two time points is obtained, where the process set includes one or more processes; and the information about the at least one hardware resource occupied by the application associated with the process in the process set is obtained according to the at least one hardware resource invoked by the process in the process set. In this manner, statistics collection is performed per process, so that information about the at least one hardware resource occupied by each application can be accurately found, and relatively intuitive information is provided.

Figure 2A:
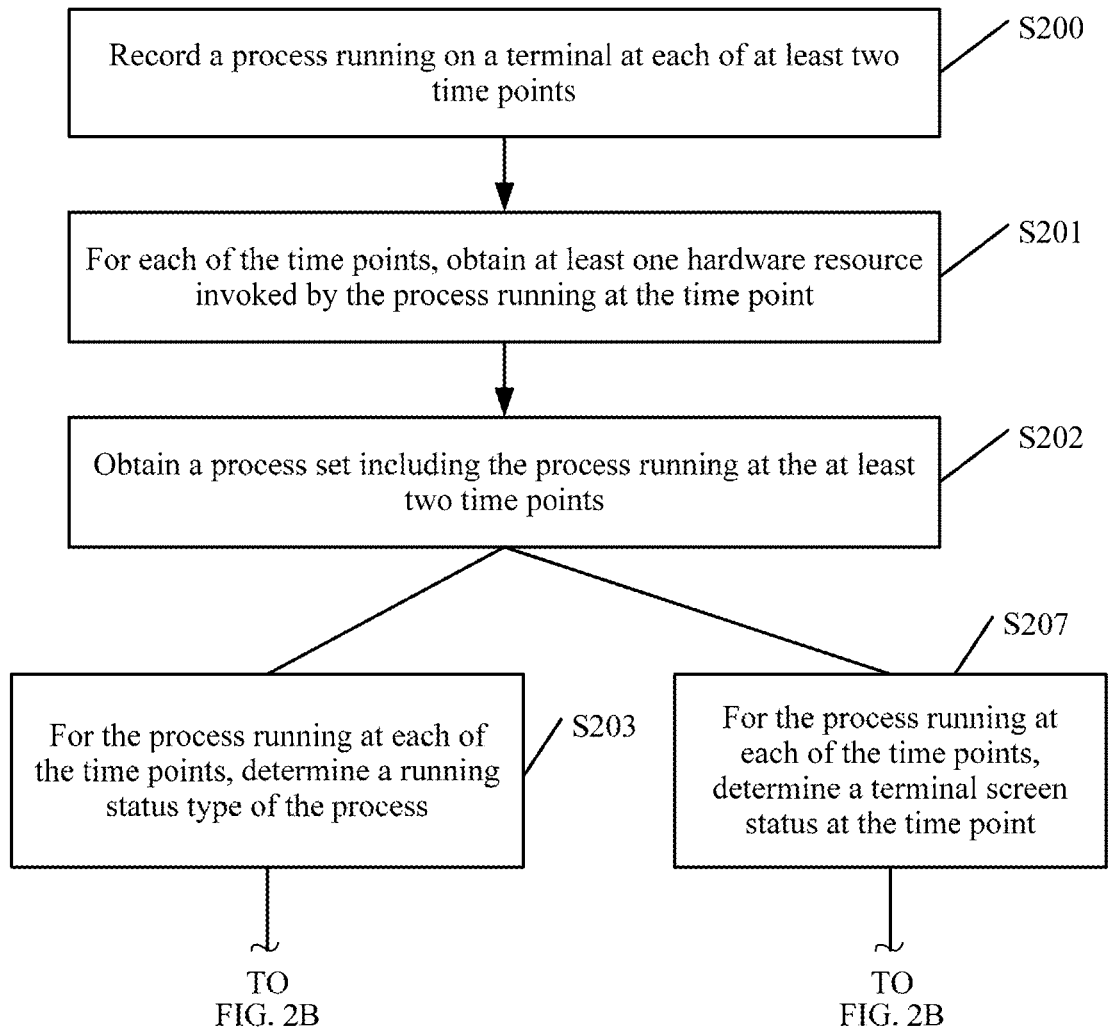
FIG. 2A and FIG. 2B are a schematic flowchart of another resource statistics collection method according to an embodiment of the present invention.
Figure 2B:
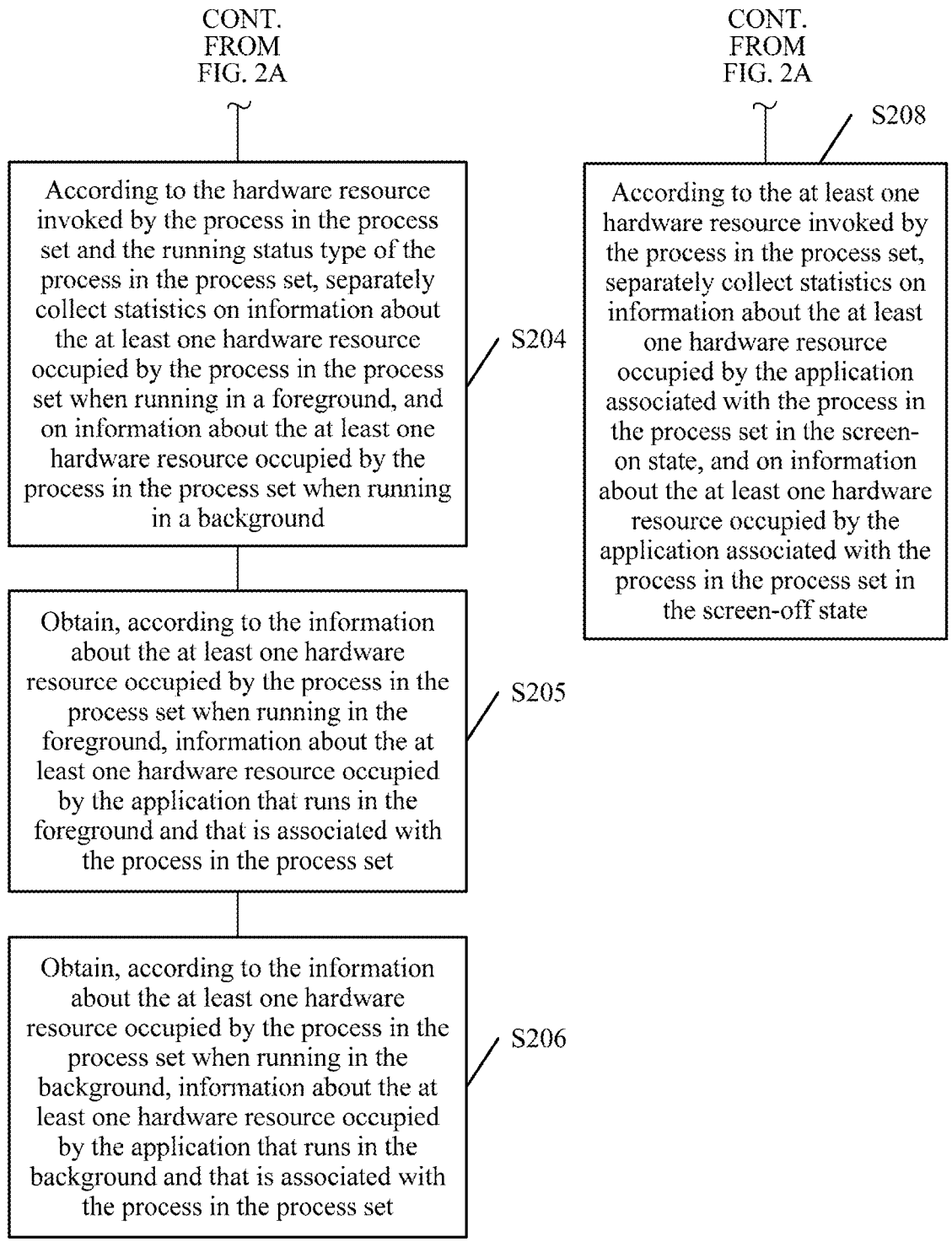

Referring to FIG. 2A and FIG. 2B, FIG. 2A and FIG. 2B are a schematic flowchart of another resource statistics collection method according to an embodiment of the present invention. As shown in the figure, the resource statistics collection method in this embodiment includes the following steps.

S200. Record a process running on a terminal at each of at least two time points.

S201. For each of the time points, obtain at least one hardware resource invoked by the process running at the time point.

S202. Obtain a process set including processes running at the at least two time points, where the process set includes one or more processes.

For steps S200 to S202 in this embodiment of the present invention, refer to steps S100 to S102 in the embodiment in FIG. 1. Details are not described herein.

Optionally, in an optional implementation, the following steps S202 to S205 may be included.

S203. For the process running at each of the time points, determine a running status type of the process, where the running status type includes foreground running or background running.

In this embodiment of the present invention, generally, when running in a background, each application also occupies the hardware resource, for example, occupies a CPU. Therefore, in this embodiment, the running status type of the process at each time point is further determined, to make a user clearly know a status of occupying the hardware resource by each application running in a foreground or running in the background. The running status type includes the foreground running or the background running.

Specifically and optionally, as shown in FIG. 5, in a process of scheduling each process and allocating hardware resources, an AMS determines, by using a controller, whether the process running at each time point runs in the foreground or runs in the background, and stores a corresponding process PID, the invoked hardware resource, and a foreground or background running status type in a storage unit.

S204. According to the hardware resource invoked by the process in the process set and the running status type of the process in the process set, separately collect statistics on information about the at least one hardware resource occupied by the process in the process set when running in a foreground, and on information about the at least one hardware resource occupied by the process in the process set when running in a background.

In this embodiment of the present invention, information about occupying each hardware resource by each process when running in the foreground may be obtained by means of statistics collection according to the recorded hardware resource invoked by each process at the at least two time points and the running status type of each process. Specifically and optionally, for a process, statuses of occupying all hardware resources by the process at all time points when running in the foreground are used as information about occupying all the hardware resources by the process when running in the foreground, and statuses of occupying all the hardware resources by the process at all time points when running in the background are used as information about occupying all the hardware resources by the process when running in the background. It should be noted that the information about occupying all the hardware resources by the process may be time points at which the process occupies all the hardware resources, or total duration in which the process occupies all the hardware resources (that is, magnitudes of occupying all the hardware resources), or may be power consumption information about occupying all the hardware resources by the process.

S205. Obtain, according to the information about the at least one hardware resource occupied by the process in the process set when running in the foreground, information about the at least one hardware resource occupied by the application that runs in the foreground and that is associated with the process in the process set.

In this embodiment of the present invention, the information about occupying each hardware resource by the application that runs in the foreground and that is associated with each process may be obtained according to the information about the hardware resource occupied by each process when running in the foreground. That is, information about a hardware resource occupied by a process when running in the foreground is used as information about the hardware resource occupied by an application associated with the process when running in the foreground.

Specifically and optionally, description is given herein by using magnitudes of occupying hardware resources by two applications (PKG: com.test.demo1 and PKG: com.test.demo2) as an example. The application com.test.demo1 includes a process whose PID=2000, and the application com.test.demo2 includes a process whose PID=2001. Statistics collection is performed per process, and statistical results are as follows:

Foreground:

PID=2000 CPU:200 s (total duration of occupying the CPU by the process PID2000 when running in the foreground is 200 s)

PID=2001 CPU:300 s (total duration of occupying the CPU by the process PID2001 when running in the foreground is 300 s)

PID=2000 GPS:200 s (total duration of occupying a GPS by the process PID2000 when running in the foreground is 200 s)

PID=2000 WiFi traffic: 10 MB (the process PID2000 consumes 10 MB WiFi traffic when running in the foreground)

Background:

PID=2000 CPU:300 s (total duration of occupying the CPU by the process PID2000 when running in the background is 300 s)

PID=2001 CPU:200 s (total duration of occupying the CPU by the process PID2001 when running in the background is 200 s)

PID=2000 GPS:300 s (total duration of occupying the GPS by the process PID2000 when running in the background is 300 s)

PID=2000 WiFi traffic: 10 MB (the process PID2000 consumes 10 MB WiFi traffic when running in the background)

PID=2001 WiFi traffic: 10 MB (the process PID2001 consumes 10 MB WiFi traffic when running in the background)

It can be learned from above that the process 2000 is associated with the application com.test.demo1, and therefore, a magnitude of occupying the CPU by the application com.test.demo1 in the foreground is 200 s, a magnitude of occupying the GPS by the application com.test.demo1 in the foreground is 200 s, and 10 MB WiFi traffic is consumed by the application com.test.demo1 in the foreground. A magnitude of occupying the CPU by the application com.test.demo1 in the background is 300 s, a magnitude of occupying the GPS by the application com.test.demo1 in the background is 300 s, and 10 MB WiFi traffic is consumed by the application com.test.demo1 in the background. Likewise, a magnitude of occupying each hardware resource by com.test.demo2 when running in the foreground and a magnitude of occupying each hardware resource by com.test.demo2 when running in the background may be obtained by means of statistics collection. Further, power consumption of each hardware occupied resource may be calculated according to the magnitude of occupying each hardware resource, and the power consumption can intuitively reflect a power consumption status of the terminal. The information that is obtained by means of statistics collection and that is about occupying each hardware resource by each process is not limited in the present invention.

Figure 3:
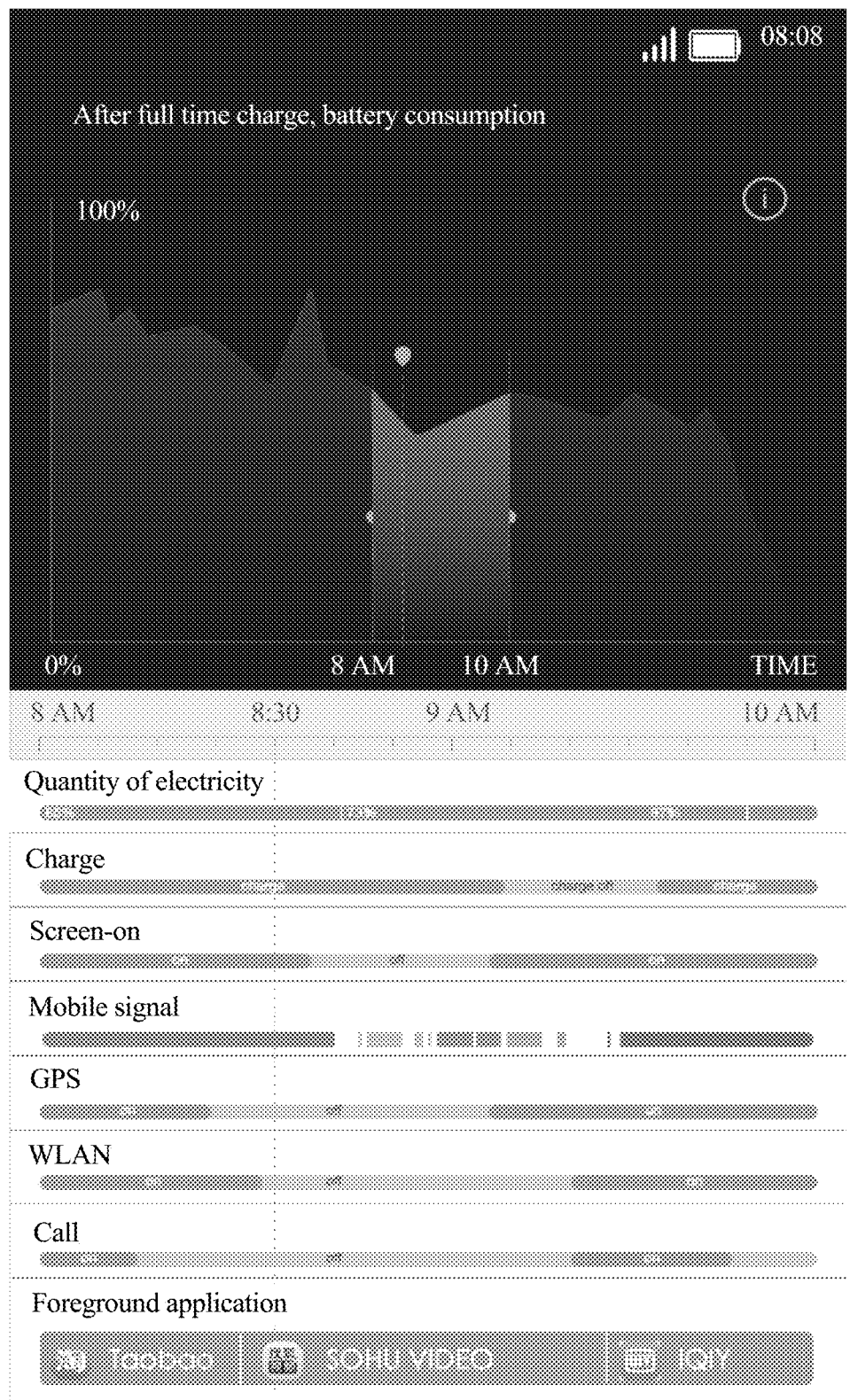
FIG. 3 is a schematic diagram of a UI interface according to an embodiment of the present invention.

Further, optionally, an application running in the foreground and an application running in the background at each time point may be displayed based on the information that is obtained by means of statistics collection and that is about occupying each hardware resource by each application at each time point when running in the foreground. As shown in FIG. 3, FIG. 3 displays a foreground application running at each time point in a time period 8:00 to 10:00, and a status of occupying each hardware resource by the foreground application. As shown in the figure, at a time point 8:30, an application running in the foreground is SOHU VIDEO; a mobile signal is used, that is, a data traffic module hardware resource is invoked; and the terminal is in a screen-on state, and therefore, an LCD hardware resource is also occupied.

Figure 4:
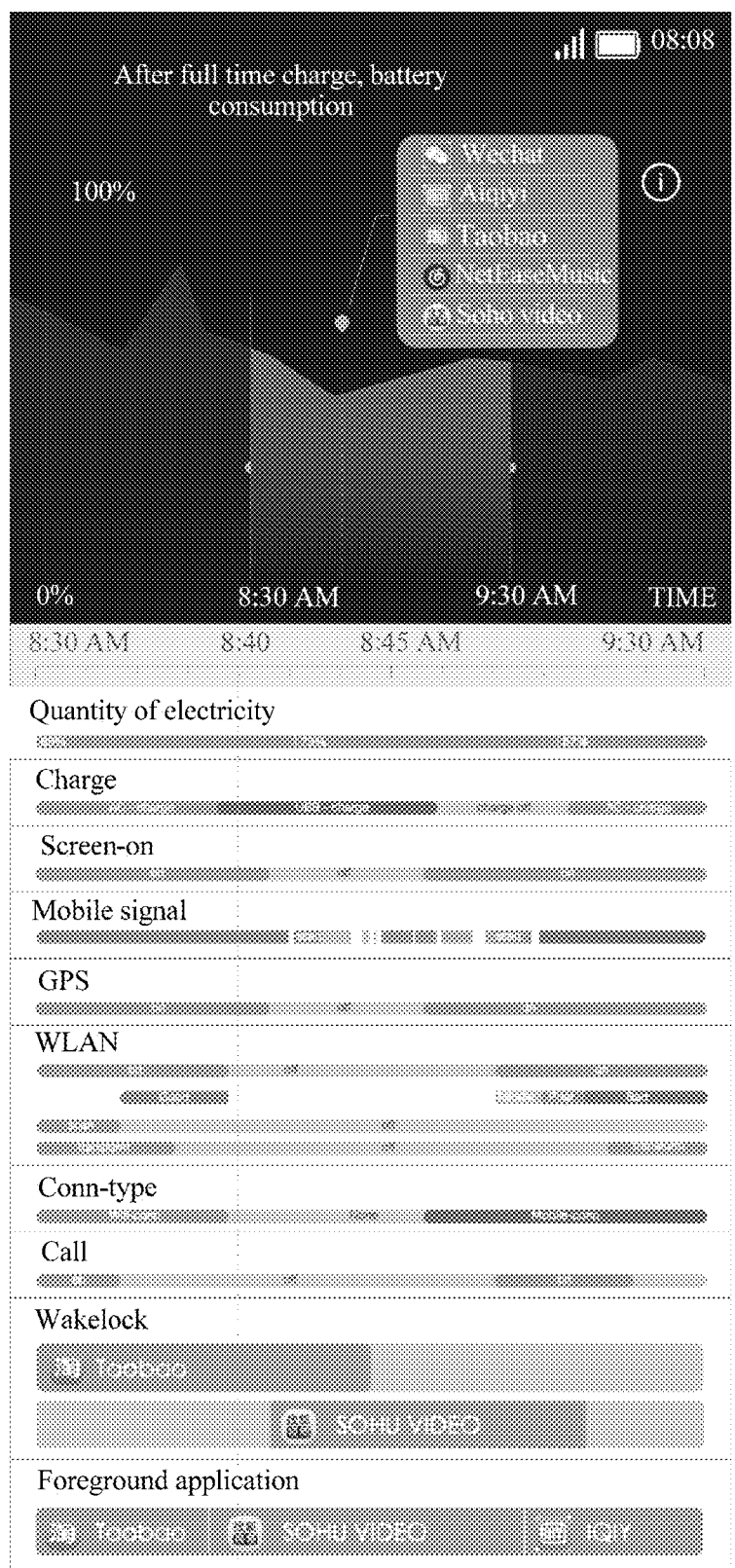
FIG. 4 is a schematic diagram of another UI interface according to an embodiment of the present invention.

Referring to FIG. 4, a foreground application and a background application that run at each time point may further be learned from a display screen. For example, at a time point 8:40, a running foreground application is SOHU VIDEO, and Taobao runs in the background.

It should be noted that a manner for displaying the information about occupying each hardware resource by each application is not limited in the present invention.

S206. Obtain, according to the information about the at least one hardware resource occupied by the process in the process set when running in the background, information about the at least one hardware resource occupied by the application that runs in the background and that is associated with the process in the process set.

In this embodiment of the present invention, the information about occupying each hardware resource by the application that runs in the background and that is associated with each process may be further obtained according to the information about the hardware resource occupied by each process when running in the background. It should be noted that the information about occupying each hardware resource by each application includes but is not limited to a time point of occupying each hardware resource by each application when running in the background, or may be total duration of occupying each hardware resource (that is, a magnitude of occupying each hardware resource), or may be power consumption information about occupying each hardware resource.

For a specific statistical method, refer to the description in step S205. Details are not described herein.

In another optional implementation, the following steps S207 and S208 may be included.

S207. For the process running at each of the time points, determine a terminal screen status at the time point, where the terminal screen status includes a screen-on state or a screen-off state.

In this embodiment of the present invention, generally, a user cares more about applications running on the terminal in the screen-on state and the screen-off state and a status of occupying each hardware resource by each application. In this embodiment of the present invention, for the process running at each time point, the terminal screen status at the time point may be further determined. It should be noted that in an Android mobile phone system, when an AMS schedules a process, a controller may determine a terminal screen status at a current time point. The terminal screen status includes the screen-on state or the screen-off state.

S208. According to the at least one hardware resource invoked by the process in the process set, separately collect statistics on information about the at least one hardware resource occupied by the application associated with the process in the process set in the screen-on state, and on information about the at least one hardware resource occupied by the application associated with the process in the process set in the screen-off state.

In this embodiment of the present invention, according to the recorded hardware resource invoked by each process at the at least two time points and the recorded terminal screen status at each time point, statistics collection is separately performed on the information about the at least one hardware resource occupied by the application associated with each process in the screen-on state (information about a hardware resource occupied by a process in the screen-on state is determined as information about the hardware resource occupied by an application associated with the process in the screen-on state), and on the information about the at least one hardware resource occupied by the application associated with each process in the screen-off state (information about a hardware resource occupied by a process in the screen-off state is determined as information about the hardware resource occupied by an application associated with the process in the screen-off state).

It should be noted that in this embodiment, the information about the hardware resource occupied by each application includes but is not limited to a time point of occupying each hardware resource by each application, a magnitude (that is, total occupation duration) of occupying each hardware resource by each application, and power consumption information about occupying each hardware resource by each application.

Description is given herein by still using the magnitudes of occupying the hardware resources by the two applications (the PKG: com.test.demo1 and the PKG: com.test.demo2) as an example. The application com.test.demo1 includes a process whose PID=2000, and the application com.test.demo2 includes a process whose PID=2001. Statistics collection is performed per process, and statistical results are as follows:

Screen-off:
PID=2000 CPU:100 s (total duration of occupying the CPU by the process PID2000 in the screen-off state is 100 s)
PID=2001 CPU:100 s (total duration of occupying the CPU by the process PID2001 in the screen-off state is 100 s)
PID=2000 GPS:200 s (total duration of occupying a GPS by the process PID2000 in the screen-off state is 100 s)
PID=2000 WiFi traffic: 10 MB (the process PID2000 consumes 10 MB WiFi traffic in the screen-off state)
PID=2001 WiFi traffic: 10 MB (the process PID2001 consumes 10 MB WiFi traffic in the screen-off state)
Screen-on:
PID=2000 CPU:400 s (total duration of occupying the CPU by the process PID2000 in the screen-on state is 400 s)
PID=2001 CPU:400 s (total duration of occupying the CPU by the process PID2001 in the screen-on state is 400 s)
PID=2000 GPS:300 s (total duration of occupying the GPS by the process PID2000 in the screen-on state is 300 s)
PID=2000 WiFi traffic: 10 MB (the process PID2000 consumes 10 MB traffic in the screen-on state)

It can be learned from above that the process 2000 is associated with the application com.test.demo1, and therefore, a magnitude of occupying the CPU by the application com.test.demo1 in the screen-off state is 100 s, a magnitude of occupying the GPS by the application com.test.demo1 in the screen-off state is 200 s, and 10 MB WiFi traffic is consumed by the application com.test.demo1 in the screen-off state. A magnitude of occupying the CPU by the application com.test.demo1 in the screen-on state is 400 s, a magnitude of occupying the GPS by the application com.test.demo1 in the screen-on state is 300 s, and 10 MB WiFi traffic is consumed by the application com.test.demo1 in the screen-on state. Likewise, a magnitude of occupying each hardware resource by com.test.demo2 in the screen-on state and a magnitude of occupying each hardware resource by com.test.demo2 in the screen-off state may be obtained by means of statistics collection.

Further, power consumption of each hardware occupied resource may be calculated according to the magnitude of occupying each hardware resource. The power consumption can intuitively reflect a power consumption status of the terminal, that is, power consumption of each hardware occupied resource by each application in the screen-on state and power consumption of each hardware occupied resource by each application in the screen-off state. The information that is obtained by means of statistics collection and that is about occupying each hardware resource by each process is not limited in the present invention.

It should be noted that statistics collection may be further performed with reference to the foreground application and the background application described in steps S202 to S205, that is, statistics collection is separately performed on the foreground application and the background application that run in the screen-on state and on the foreground application and the background application that run in the screen-off state.

In this embodiment of the present invention, the process running on the terminal at each of the at least two time points is recorded; for each of the time points, the at least one hardware resource invoked by the process running at the time point is obtained; the process set including processes running at the at least two time points is obtained, where the process set includes one or more processes; and the information about the at least one hardware resource occupied by the application associated with the process in the process set is obtained according to the at least one hardware resource invoked by the process in the process set. In this manner, statistics collection is performed per process, so that information about the at least one hardware resource occupied by each application can be accurately found, and relatively intuitive information is provided.

Figure 7:
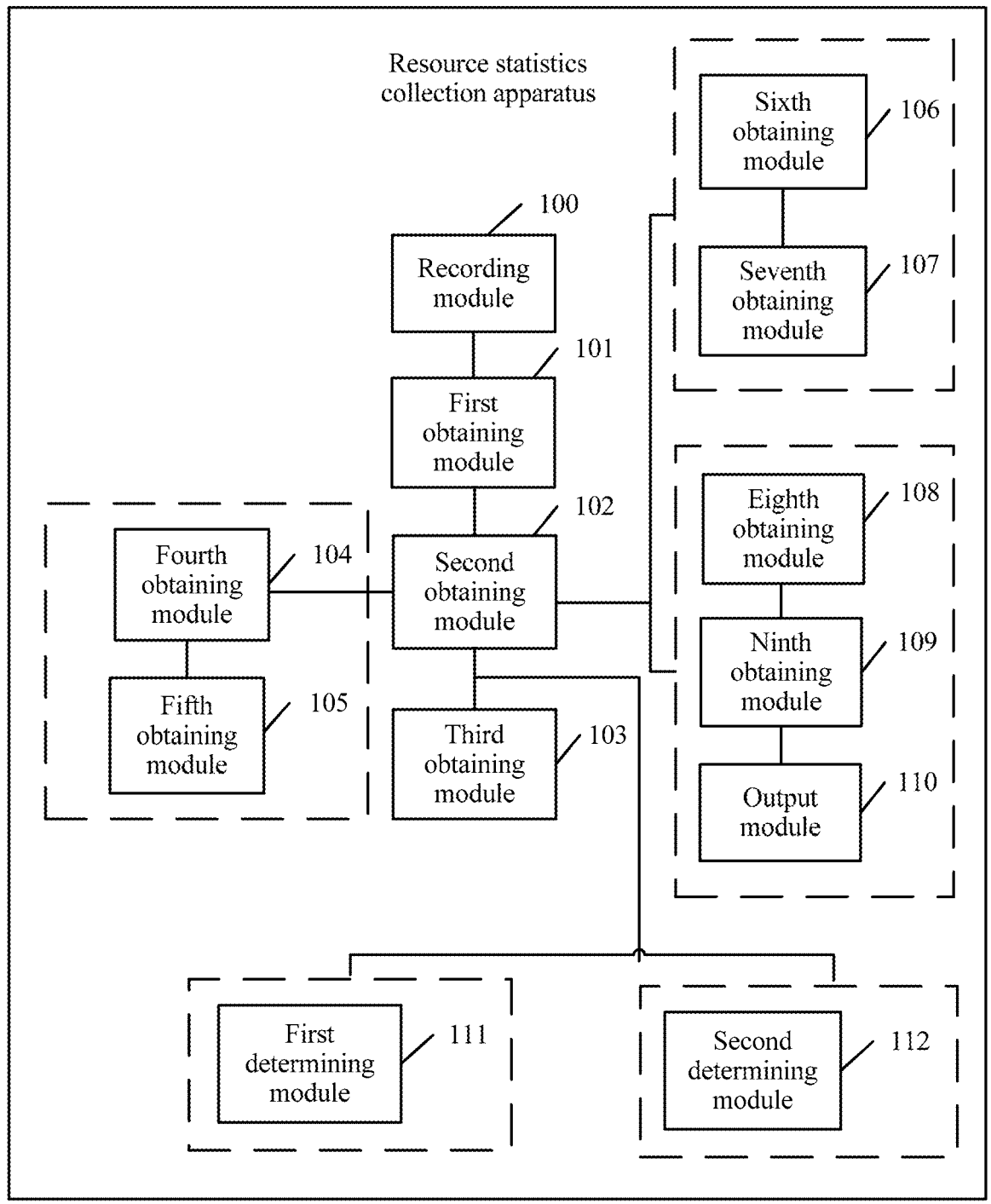
FIG. 7 is a schematic structural diagram of a resource statistics collection apparatus according to an embodiment of the present invention.

Referring to FIG. 7, FIG. 7 is a schematic structural diagram of a resource statistics collection apparatus according to an embodiment of the present invention. As shown in the figure, the resource statistics collection apparatus in this embodiment of the present invention includes:

a recording module 100, configured to record a process running on a terminal at each of at least two time points;

a first obtaining module 101, configured to: for each of the time points, obtain at least one hardware resource invoked by the process running at the time point;

a second obtaining module 102, configured to obtain a process set including processes running at the at least two time points, where the process set includes one or more processes; and a third obtaining module 103, configured to obtain, according to the at least one hardware resource invoked by the process in the process set, information about the at least one hardware resource occupied by an application associated with the process in the process set.

Optionally, the apparatus may further include a fourth obtaining module 104 and a fifth obtaining module 105.

The fourth obtaining module 104 is configured to: if a first occupation information obtaining request is received, obtain a first process set including a process running within a first time period in a time period including the at least two time points, where the first occupation information obtaining request is used to request to obtain information about a hardware resource occupied within the first time period.

The fifth obtaining module 105 is configured to obtain, according to the hardware resource invoked by the process in the first process set, information about the at least one hardware resource occupied within the first time period by a first application associated with the process in the first process set.

Optionally, the apparatus may further include a sixth obtaining module 106 and a seventh obtaining module 107.

The sixth obtaining module 106 is configured to: if a second occupation information obtaining request is received, obtain a second process set including a process associated with a second application, where the second occupation information obtaining request is used to request to obtain information about a hardware resource occupied by the second application within a second time period in a time period including the at least two time points.

The seventh obtaining module 107 is configured to obtain, according to the hardware resource invoked by the process in the second process set within the second time period, information about the at least one hardware resource occupied by the second application within the second time period.

Optionally, the apparatus may further include an eighth obtaining module 108, a ninth obtaining module 109, and an output module 110.

The eighth obtaining module 108 is configured to: if a third occupation information obtaining request is received, obtain a third process set including a process invoking a target hardware resource within a third time period in a time period including the at least two time points, where the third occupation information obtaining request is used to request to obtain information about the target hardware resource occupied within the third time period.

The ninth obtaining module 109 is configured to obtain, according to information about invoking the target hardware resource by the process in the third process set within the third time period, the information about the target hardware resource occupied within the third time period by a third application associated with the process in the third process set.

The output module 110 is configured to output the information about the target hardware resource occupied and an identifier of the target hardware resource.

The foregoing information about the hardware resource occupied includes at least one of information about a time point at which the hardware resource is occupied, information about a quantity of occupied hardware resources, or information about power consumption for occupying the hardware resource.

Optionally, if the information about the at least one hardware resource occupied by the application associated with the process in the process set includes information about a quantity of the at least one hardware resource occupied by the application, that a third obtaining module 103 obtains, according to the at least one hardware resource invoked by the process in the process set, information about the at least one hardware resource occupied by an application associated with the process in the process set specifically includes:

obtaining, according to the at least one hardware resource invoked by the process in the process set, a quantity of the at least one hardware resource occupied by the process in the process set; and obtaining, according to the quantity of the at least one hardware resource occupied by the process in the process set, the information about a quantity of the at least one hardware resource occupied by the application associated with the process in the process set.

Optionally, if the information about the at least one hardware resource occupied by the application associated with the process in the process set includes information about power consumption for the at least one hardware resource occupied by the application, that a third obtaining module 103 obtains, according to the at least one hardware resource invoked by the process in the process set, information about the at least one hardware resource occupied by an application associated with the process in the process set specifically includes:

obtaining, according to the at least one hardware resource invoked by the process in the process set, a quantity of the at least one hardware resource occupied by the process in the process set;

obtaining, according to the quantity of the at least one hardware resource occupied by the process in the process set and power of the hardware resource, information about power consumption for the at least one hardware resource occupied by the process in the process set; and obtaining, according to the information about power consumption for the at least one hardware resource occupied by the process in the process set, the information about power consumption for the at least one hardware resource occupied by the application associated with the process in the process set.

Optionally, the apparatus further includes a first determining module 111.

The first determining module 111 is configured to: for the process running at each of the time points, determine a running status type of the process, where the running status type includes foreground running or background running; and that a third obtaining module 103 obtains, according to the at least one hardware resource invoked by the process in the process set, information about the at least one hardware resource occupied by an application associated with the process in the process set specifically includes:

according to the hardware resource invoked by the process in the process set and the running status type of the process in the process set, separately collecting statistics on information about the at least one hardware resource occupied by the process in the process set when running in a foreground, and on information about the at least one hardware resource occupied by the process in the process set when running in a background;

obtaining, according to the information about the at least one hardware resource occupied by the process in the process set when running in the foreground, information about the at least one hardware resource occupied by the application that runs in the foreground and that is associated with the process in the process set; and obtaining, according to the information about the at least one hardware resource occupied by the process in the process set when running in the background, information about the at least one hardware resource occupied by the application that runs in the background and that is associated with the process in the process set.

Optionally, the apparatus may further include a second determining module 112.

The second determining module 112 is configured to: for the process running at each of the time points, determine a terminal screen status at the time point, where the terminal screen status includes a screen-on state or a screen-off state; and that a third obtaining module 103 obtains, according to the at least one hardware resource invoked by the process in the process set, information about the at least one hardware resource occupied by an application associated with the process in the process set specifically includes:

according to the at least one hardware resource invoked by the process in the process set, separately collecting statistics on information about the at least one hardware resource occupied by the application associated with the process in the process set in the screen-on state, and on information about the at least one hardware resource occupied by the application associated with the process in the process set in the screen-off state.

In this embodiment of the present invention, the process running on the terminal at each of the at least two time points is recorded; for each of the time points, the at least one hardware resource invoked by the process running at the time point is obtained; the process set including processes running at the at least two time points is obtained, where the process set includes one or more processes; and the information about the at least one hardware resource occupied by the application associated with the process in the process set is obtained according to the at least one hardware resource invoked by the process in the process set. In this manner, statistics collection is performed per process, so that information about the at least one hardware resource occupied by each application can be accurately found, and relatively intuitive information is provided.

It may be understood that for specific implementations of all the modules in the foregoing resource statistics collection apparatus, further refer to the corresponding description in the method embodiment.

Figure 8:
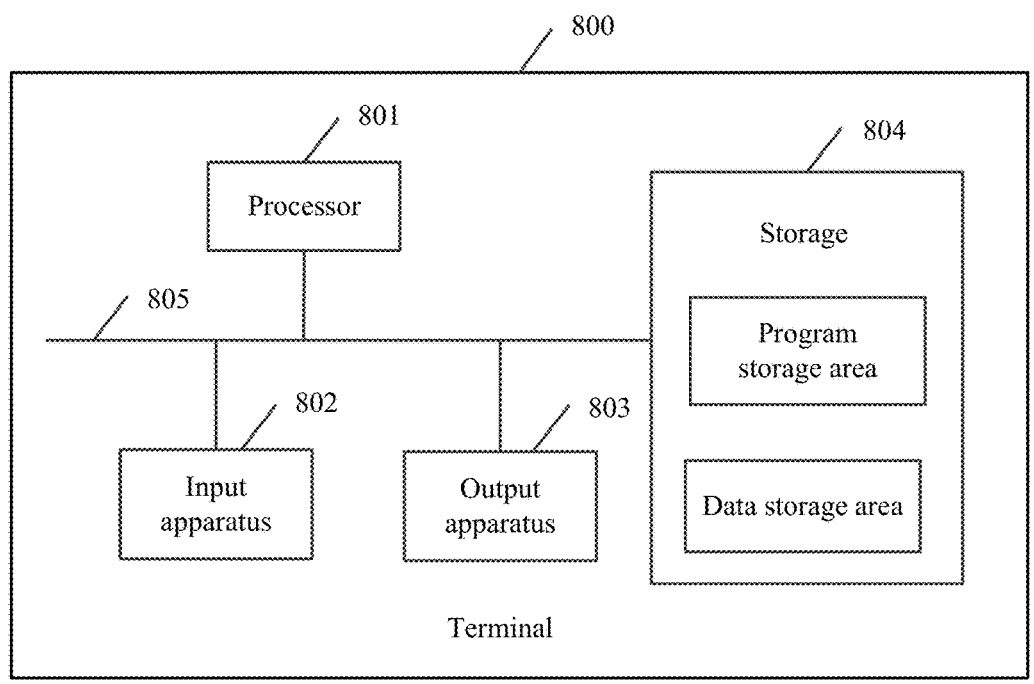
FIG. 8 is a schematic structural diagram of a terminal according to an embodiment of the present invention.

Referring to FIG. 8, FIG. 8 is a schematic structural diagram of a terminal according to an embodiment of the present invention. As shown in the figure, the terminal shown in FIG. 8 is configured to execute the resource statistics collection method disclosed in the embodiment of the present invention. As shown in FIG. 8, the terminal 800 may include at least one processor 801, for example, a CPU (Central Processing Unit, central processing unit), at least one input apparatus 802, at least one output apparatus 803, a storage 804, and a communications bus 805. A person skilled in the art may understand that a structure of the terminal 800 shown in FIG. 8 imposes no limitation on the present invention. The structure may be a bus structure, or may be a star structure; and may further include more or fewer parts than those shown in FIG. 8, for example, a communications component configured to implement a function such as communicating with another terminal or accessing a network, or a positioning component configured to obtain map information and provide a user with a service such as navigation; or combine some parts, or have different parts arrangements. The input apparatus 802 may be a touchscreen, a voice input apparatus, a keyboard, a mouse, a handwriting tablet, or another apparatus that can implement inputting. The output apparatus 803 may be a display, a loudspeaker, a projector, or another apparatus by using which the user can receive a result output by the terminal.

The storage 804 is configured to store a software program and a module. The processor 801 performs various function applications of the user terminal and implements resource statistics collection by running the software program and the module that are stored in the storage 804. The storage 804 mainly includes a program storage area and a data storage area. The program storage area may store an operating system, an application program required by at least one function, such as a sound playing program or an image playing program. The data storage area may store data (such as audio data or a phone book) created according to use of the terminal, and the like.

In a specific implementation of the present invention, the storage 804 may include a volatile memory, such as a nonvolatile dynamic random access memory (Nonvolatile Random Access Memory, NVRAM for short), a phase change RAM (Phase Change RAM, PRAM for short), or a magnetoresistive RAM (Magetoresistive RAM, MRAM for short), and may further include a nonvolatile memory, such as at least one magnetic disk storage device, an electrically erasable programmable read-only memory (Electrically Erasable Programmable Read-Only Memory, EEPROM for short), or a flash memory device, such as an NOR flash memory (NOR flash memory) or an NAND flash memory (NAND flash memory). The application program includes any application installed on the user terminal, including but not limited to a browser, an email, an instant messaging service, word processing, keyboard virtualization, a widget (Widget), encryption, digital copyright management, speech recognition, speech reproduction, positioning (for example, a function provided by a global positioning system), music playback, or the like.

The communications bus 805 is configured to implement connection and communication between the processor 801, the input apparatus 802, the output apparatus 803, and the storage 804. The communications bus 805 may be an Industry Standard Architecture (Industry Standard Architecture, ISA for short) bus, a Peripheral Component Interconnect (Peripheral Component, PCI for short) bus, an Extended Industry Standard Architecture (Extended Industry Standard Architecture, EISA for short) bus, or the like. The communications bus 805 may be classified into an address bus, a data bus, a control bus, and the like. For ease of denotation, the communications bus is represented by using only one thick line in FIG. 8. However, it does not mean that there is only one bus or only one type of bus.

The processor 801 is a control center of the terminal 800, is connected to all parts of the entire terminal 800 by using various interfaces and lines, and runs or executes the software program and/or the module that are/is stored in the storage 804 and invokes the data stored in the storage 804, so as to perform the following operations:

recording a process running on a terminal at each of at least two time points;

for each of the time points, obtaining at least one hardware resource invoked by the process running at the time point;

obtaining a process set including processes running at the at least two time points, where the process set includes one or more processes; and obtaining, according to the at least one hardware resource invoked by the process in the process set, information about the at least one hardware resource occupied by an application associated with the process in the process set.

Optionally, the processor 801 is further configured to invoke the program code stored in the storage, so as to perform the following steps:

if a first occupation information obtaining request is received by using the input apparatus 802, obtaining a first process set including a process running within a first time period in a time period including the at least two time points, where the first occupation information obtaining request is used to request to obtain information about a hardware resource occupied within the first time period; and obtaining, according to the hardware resource invoked by the process in the first process set, information about the at least one hardware resource occupied within the first time period by a first application associated with the process in the first process set.

Optionally, the processor 801 is further configured to invoke the program code stored in the storage, so as to perform the following steps:

if a second occupation information obtaining request is received by using the input apparatus 802, obtaining a second process set including a process associated with a second application, where the second occupation information obtaining request is used to request to obtain information about a hardware resource occupied by the second application within a second time period in a time period including the at least two time points; and obtaining, according to the hardware resource invoked by the process in the second process set within the second time period, information about the at least one hardware resource occupied by the second application within the second time period.

Optionally, the processor 801 is further configured to invoke the program code stored in the storage, so as to perform the following steps:

if a third occupation information obtaining request is received by using the input apparatus 802, obtaining a third process set including a process invoking a target hardware resource within a third time period in a time period including the at least two time points, where the third occupation information obtaining request is used to request to obtain information about the target hardware resource occupied within the third time period;

obtaining, according to information about invoking the target hardware resource by the process in the third process set within the third time period, the information about the target hardware resource occupied within the third time period by a third application associated with the process in the third process set; and outputting, by using the output apparatus 803, the information about the target hardware resource occupied and an identifier of the target hardware resource.

The foregoing information about the hardware resource occupied includes at least one of information about a time point at which the hardware resource is occupied, information about a quantity of occupied hardware resources, or information about power consumption for occupying the hardware resource.

If the information about the at least one hardware resource occupied by the application associated with the process in the process set includes information about a quantity of the at least one hardware resource occupied by the application, the obtaining, by the processor 801 according to the at least one hardware resource invoked by the process in the process set, information about the at least one hardware resource occupied by an application associated with the process in the process set includes:

obtaining, according to the at least one hardware resource invoked by the process in the process set, a quantity of the at least one hardware resource occupied by the process in the process set; and obtaining, according to the quantity of the at least one hardware resource occupied by the process in the process set, the information about a quantity of the at least one hardware resource occupied by the application associated with the process in the process set.

If the information about the at least one hardware resource occupied by the application associated with the process in the process set includes information about power consumption for the at least one hardware resource occupied by the application, the obtaining, by the processor 801 according to the at least one hardware resource invoked by the process in the process set, information about the at least one hardware resource occupied by an application associated with the process in the process set includes:

obtaining, according to the at least one hardware resource invoked by the process in the process set, a quantity of the at least one hardware resource occupied by the process in the process set;

obtaining, according to the quantity of the at least one hardware resource occupied by the process in the process set and power of the hardware resource, information about power consumption for the at least one hardware resource occupied by the process in the process set; and obtaining, according to the information about power consumption for the at least one hardware resource occupied by the process in the process set, the information about power consumption for the at least one hardware resource occupied by the application associated with the process in the process set.

Optionally, the processor 801 is further configured to invoke the program code stored in the storage, so as to perform the following step:

for the process running at each of the time points, determining a running status type of the process, where the running status type includes foreground running or background running; and the obtaining, by the processor 801 according to the at least one hardware resource invoked by the process in the process set, information about the at least one hardware resource occupied by an application associated with the process in the process set includes:

according to the hardware resource invoked by the process in the process set and the running status type of the process in the process set, separately collecting statistics on information about the at least one hardware resource occupied by the process in the process set when running in a foreground, and on information about the at least one hardware resource occupied by the process in the process set when running in a background;

obtaining, according to the information about the at least one hardware resource occupied by the process in the process set when running in the foreground, information about the at least one hardware resource occupied by the application that runs in the foreground and that is associated with the process in the process set; and obtaining, according to the information about the at least one hardware resource occupied by the process in the process set when running in the background, information about the at least one hardware resource occupied by the application that runs in the background and that is associated with the process in the process set.

Optionally, the processor 801 is further configured to invoke the program code stored in the storage, so as to perform the following step:

for the process running at each of the time points, determining a terminal screen status at the time point, where the terminal screen status includes a screen-on state or a screen-off state; and the obtaining, by the processor 801 according to the at least one hardware resource invoked by the process in the process set, information about the at least one hardware resource occupied by an application associated with the process in the process set includes:

according to the at least one hardware resource invoked by the process in the process set, separately collecting statistics on information about the at least one hardware resource occupied by the application associated with the process in the process set in the screen-on state, and on information about the at least one hardware resource occupied by the application associated with the process in the process set in the screen-off state.

In this embodiment of the present invention, the process running on the terminal at each of the at least two time points is recorded; for each of the time points, the at least one hardware resource invoked by the process running at the time point is obtained; the process set including processes running at the at least two time points is obtained, where the process set includes one or more processes; and the information about the at least one hardware resource occupied by the application associated with the process in the process set is obtained according to the at least one hardware resource invoked by the process in the process set. In this manner, statistics collection is performed per process, so that information about the at least one hardware resource occupied by each application can be accurately found, and relatively intuitive information is provided.

It may be understood that for specific implementations of all the components in the foregoing terminal, further refer to the corresponding description in the method embodiment.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

A sequence of the steps of the method in the embodiments of the present invention may be adjusted, and some steps may also be merged or removed according to an actual need.

The modules in the memory access apparatus in the embodiments of the present invention may be combined, divided, or removed according to an actual need.

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A terminal, comprising a processor, a storage, a battery, and a display, wherein the processor, the storage, and at least one hardware resource are separately connected to a communications bus, a set of program code is stored in the storage, and the processor is configured to invoke the program code stored in the storage to perform:
   obtaining, for a time range, battery information for the terminal, the battery information comprising a percentage of remaining battery charge;
   obtaining, for a selected time period, information about power consumption for an application executed by the processor; wherein the information about power consumption for an application comprising at least one of an amount of time the display is occupied by the application within the selected time period, or an amount of time the application is running in a background within the selected time period; and wherein the selected time period is a part of or all of the time range; and
   causing a user interface to be output by the display, the user interface comprising:
   a graphical representation of the percentage of battery charge remaining over the time range;
   a differentiated portion of the graphical representation corresponding to the selected time period, the differentiated portion of the graphical representation being displayed differently from a remainder of the graphical representation outside the selected time period; and
   an indication that at least one of the amount of time the display is occupied by the application within the selected time period.

2. The terminal of claim 1, wherein the application is a first application, and the user interface comprises statistical data associated with the first application and corresponding statistical data associated with a second application.

3. The terminal of claim 1, wherein:
   the processor is further configured to obtain, for the selected time period, the information about power consumption for the terminal; and
   the information about the power consumption for the terminal comprises at least one of:
   an amount of time the display is in a screen-on state within the selected time period, or
   an amount of time the display is in a screen-off state within the selected time period.

4. The terminal of claim 3, wherein the at least one of the amount of time the display is:
   (i) in the screen-on state within the selected time period, or
   (ii) in the screen-off state within the selected time period.

5. The terminal of claim 4, wherein
   the user interface comprises a graphical representation of the amount of time the display is in the screen-on state within the selected time period and the amount of time the display is in the screen-off state within the selected time period, over the selected time period, and
   a first portion of the graphical representation of the amount of time the display is in the screen-on state within the selected time period is displayed differently from a second portion of the graphical representation of the amount of time the display is in the screen-off state within the selected time period.

6. The terminal of claim 1, further comprising:
   causing the user interface to display information indicating a power consumption status of the application based on a total power consumption of one or more hardware resources occupied by the application within the selected time period.

7. The terminal of claim 1, wherein the processor is further configured to determine the selected time period, including determining a start time point and an end time point of the selected time period, based on user-operation input.

8. The terminal of claim 1, wherein the information about power consumption for an application comprising further comprising a percentage of battery is used by the application.

9. The terminal of claim 1, the information about power consumption for a terminal further comprising at least one of an amount of time the display is in a charging state within the selected time period.

10. The terminal of claim 1, the user interface comprising a graphical representation of the at least one of the amount of time the display is in the charging state.

11. A resource statistics collection method, comprising:
    obtaining, for a time range, battery information for a terminal comprising a processor, a battery and a display, the battery information comprising a percentage of remaining battery charge;
    detecting a selection of at least two time points in the time range, the two time points defining a selected time period;

obtaining, for the selected time period, information about power consumption for an application executed by the processor, wherein the information about power consumption for the application comprising at least one of an amount of time the display is occupied by the application within the selected time period, or an amount of time the application is running in a background within the selected time period; and wherein the selected time period is a part of or all of the time range; and causing a user interface to be output by the display, the user interface comprising:

a graphical representation of the percentage of battery charge remaining over the time range;

a differentiated portion of the graphical representation corresponding to the selected time period, the differentiated portion of the graphical representation being displayed differently from a remainder of the graphical representation outside the selected time period; and the information about power consumption for the application within the selected time period.

12. The method of claim 11, wherein the application is a first application, and the user interface comprises statistical data associated with the first application and corresponding statistical data associated with a second application.

13. The method of claim 11, the method further comprising:

obtaining, for the selected time period, the information about power consumption for the terminal;

wherein the information about the power consumption for the terminal comprises at least one of:

an amount of time the display is in a screen-on state within the selected time period, or in a screen-off state within the selected time period.

14. The method of claim 13, wherein the at least one of the amount of time the display is:

(i) in the screen-on state within the selected time period, or (ii) in the screen-off state within the selected time period.

15. The method of claim 14, wherein the user interface comprises a graphical representation of the amount of time the display is in the screen-on state within the selected time period and the amount of time the display is in the screen-off state within the selected time period, over the selected time period, and a first portion of the graphical representation of the amount of time the display is in the screen-on state within the selected time period is displayed differently from a second portion of the graphical representation of the amount of time the display is in the screen-off state within the selected time period.

16. The method of claim 11, further comprising:

causing the user interface to display information indicating a power consumption status of the application based on a total power consumption of one or more hardware resources occupied by the application within the selected time period.

17. The method of claim 11, wherein the selected time period includes a start time point and an end time point of the selected time period which are determined based on user-operation input.

18. A non-transitory computer readable storage medium comprising instructions to cause an apparatus to:

obtain, for a time range, battery information for a terminal, the battery information comprising a percentage of remaining battery charge;

obtain, for a selected time period, information about power consumption for an application executed by a processor, wherein the information about power consumption for an application comprising at least one of an amount of time the display is occupied by the application within the selected time period, or an amount of time the application is running in a background within the selected time period; and wherein the selected time period is a part of or all of the time range; and display a user interface, the user interface comprising:

a graphical representation of the percentage of battery charge remaining over the time range;

a differentiated portion of the graphical representation corresponding to the selected time period, the differentiated portion of the graphical representation being displayed differently from a remainder of the graphical representation outside the selected time period; and an indication that at least one of the amount of time the display is occupied by the application within the selected time period.

19. The computer readable storage medium of claim 18, wherein the application is a first application, and the user interface comprises statistical data associated with the first application and corresponding statistical data associated with a second application.

20. The computer readable storage medium of claim 18, wherein:

the apparatus is further caused to obtain, for the selected time period, the information about power consumption for the terminal; and the information about the power consumption for the terminal comprises:

at least one of an amount of time the display is in a screen-on state within the selected time period, or in a screen-off state within the selected time period.

21. The computer readable storage medium of claim 19, wherein the at least one of the amount of time the display is:

(i) in the screen-on state within the selected time period, (ii) in the screen-off state within the selected time period included in the user interface comprising a graphical representation of the at least one of the amount of time the display is in the screen-on state within the selected time period, or (iii) in the screen-off state within the selected time period, over the selected time period.

22. The computer readable storage medium of claim 19, wherein the user interface comprises a graphical representation of the amount of time the display is in a screen-on state within the selected time period and the amount of time the display is in a screen-off state within the selected time period, over the selected time period, and a first portion of the graphical representation of the amount of time the display is in the screen-on state within the selected time period is displayed differently from a second portion of the graphical representation of the amount of time the display is in the screen-off state within the selected time period.

23. The computer readable storage medium of claim 19, wherein the selected time period includes a start time point and an end time point of the selected time period which are determined based on user-operation input.

* * * * *